US012567135B2

(12) United States Patent
Wu et al.

(10) Patent No.: US 12,567,135 B2
(45) Date of Patent: Mar. 3, 2026

(54) MULTIMEDIA PLAYBACK MONITORING SYSTEM AND METHOD, AND ELECTRONIC APPARATUS

(71) Applicant: BOE TECHNOLOGY GROUP CO., LTD., Beijing (CN)

(72) Inventors: Yanhong Wu, Beijing (CN); Hao Fang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 242 days.

(21) Appl. No.: 18/580,103

(22) PCT Filed: Aug. 29, 2022

(86) PCT No.: PCT/CN2022/115361
§ 371 (c)(1),
(2) Date: Jan. 17, 2024

(87) PCT Pub. No.: WO2024/044868
PCT Pub. Date: Mar. 7, 2024

(65) Prior Publication Data
US 2025/0086768 A1     Mar. 13, 2025

(51) Int. Cl.
*G06T 7/00* (2017.01)
*G06F 21/64* (2013.01)
*G06T 11/00* (2006.01)

(52) U.S. Cl.
CPC ............ *G06T 7/0002* (2013.01); *G06F 21/64* (2013.01); *G06T 11/00* (2013.01); *G06T 2210/08* (2013.01)

(58) Field of Classification Search
CPC ............... H04N 1/32144; H04N 19/46; H04N 21/4325; G06T 1/0021; G06T 2201/0051;
(Continued)

(56) References Cited

U.S. PATENT DOCUMENTS

2010/0309202 A1* 12/2010 Watanabe ............ H04N 13/398
                                                            345/419
2018/0288497 A1* 10/2018 Adams .................. G06T 1/0021
2022/0415236 A1* 12/2022 Zhao .................. H04N 21/4312

FOREIGN PATENT DOCUMENTS

CN          110020899 A       7/2019
CN          111698325 A       9/2020
(Continued)

*Primary Examiner* — Weiming He
(74) *Attorney, Agent, or Firm* — HOUTTEMAN LAW LLC

(57) ABSTRACT

A multimedia playback monitoring system includes an authentication image generator, a playback controller, an image compressor, and an analyzer. The authentication image generator is configured to generate a first transparent image according to a display terminal, and embed first identification information into the first transparent image to obtain an identity authentication image for a playback plan. The playback controller is configured to generate data to be displayed according to a received playback plan, a multimedia file corresponding to the playback plan, and the identity authentication image. The image compressor is configured to take and compress a screenshot of a target image displayed by the display terminal to obtain compressed data. The analyzer is configured to analyze the compressed data to obtain second identification information, compare the second identification information with the first identification information, and determine whether display by the display terminal is accurate according to a comparison result.

17 Claims, 6 Drawing Sheets

(58) Field of Classification Search
CPC ....... G06T 11/00; G06T 7/0002; G06F 21/64;
G09G 2340/0407
See application file for complete search history.

(56) References Cited

FOREIGN PATENT DOCUMENTS

| CN | 109660837 | B | * | 12/2020 | ......... H04N 21/4307 |
|----|-----------|---|---|---------|------------------------|
| CN | 112148896 | A |   | 12/2020 | |
| CN | 112565922 | A |   | 3/2021  | |
| CN | 113645379 | A |   | 11/2021 | |
| CN | 114860182 | A |   | 8/2022  | |

* cited by examiner

Identity authentication information

Resolution of the display terminal

Compressed data

The identity authentication information is encoded to obtain the first encoded data A hashing process is performed on the first encoded data to obtain the first hash data The first target pixel number N1 and the second target pixel number N2 are determined according to a resolution The encoded subdata in the second encoded data is extracted with N1 as a step length (i.e., step size), and the hash subdata in the second hash data is extracted with N2 as a step length The first hash data and the second hash data are compared with each other Whether the information is unchanged is determined YES → Successful comparison

NO

The first encoded data and the second encoded data are compared with each other

Whether the information is unchanged is determined

YES → Successful comparison

NO

Analyzing-comparing algorithm

Comparison failure

FIG. 8

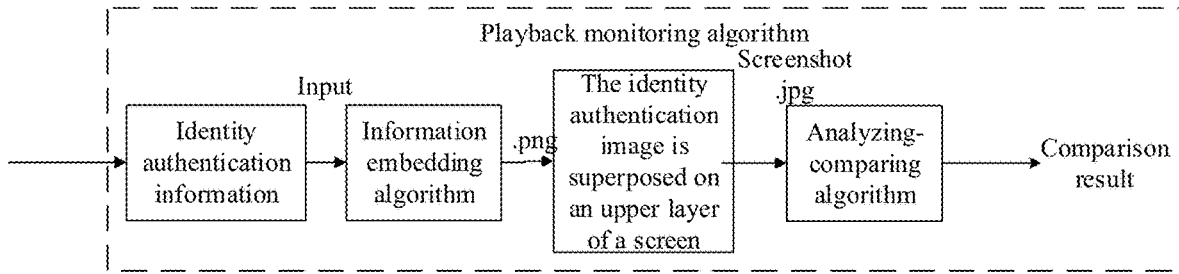

Playback monitoring algorithm

Input

Screenshot .jpg

Identity authentication information

.png

Information embedding algorithm

The identity authentication image is superposed on an upper layer of a screen

Analyzing-comparing algorithm

Comparison result

FIG. 9

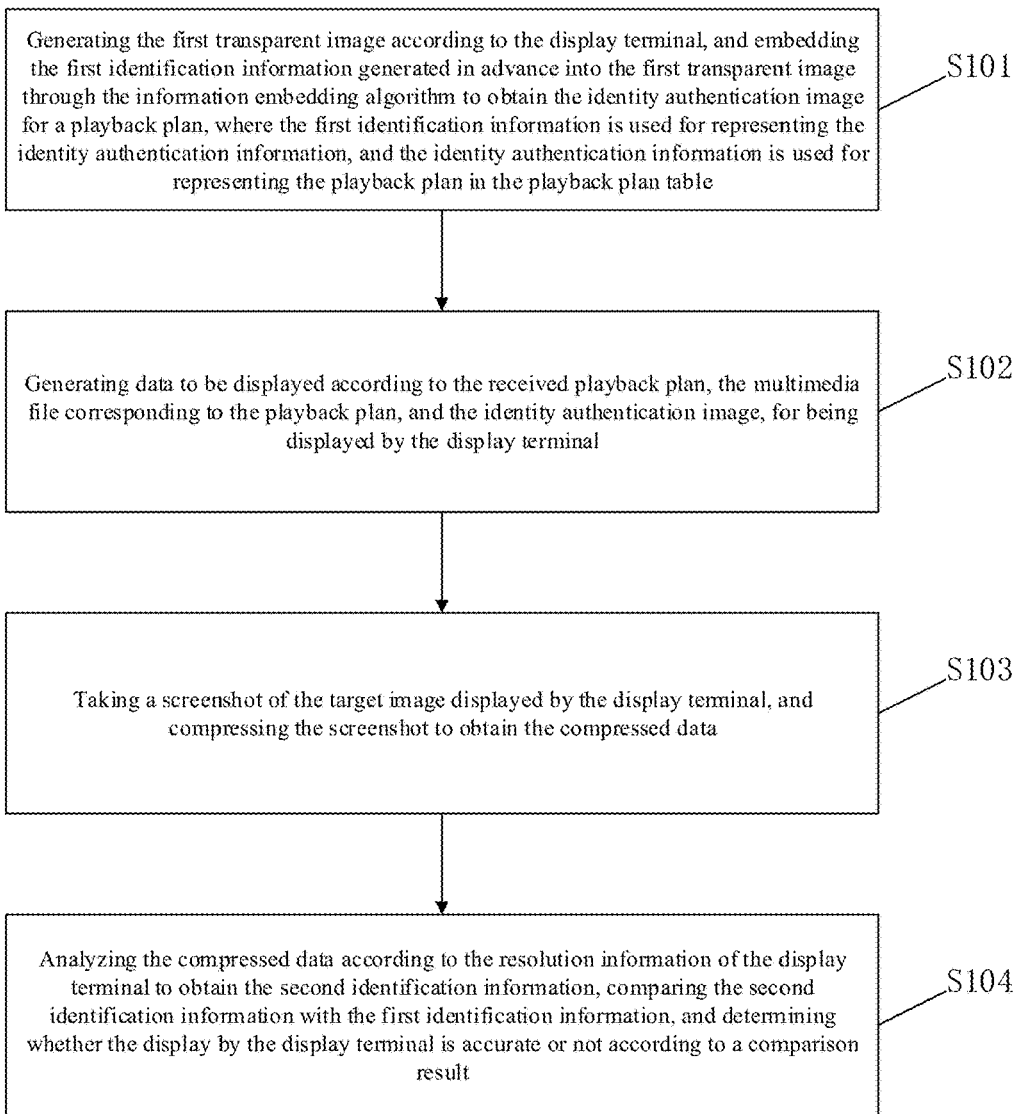

Generating the first transparent image according to the display terminal, and embedding the first identification information generated in advance into the first transparent image through the information embedding algorithm to obtain the identity authentication image for a playback plan, where the first identification information is used for representing the identity authentication information, and the identity authentication information is used for representing the playback plan in the playback plan table — S101

Generating data to be displayed according to the received playback plan, the multimedia file corresponding to the playback plan, and the identity authentication image, for being displayed by the display terminal — S102

Taking a screenshot of the target image displayed by the display terminal, and compressing the screenshot to obtain the compressed data — S103

Analyzing the compressed data according to the resolution information of the display terminal to obtain the second identification information, comparing the second identification information with the first identification information, and determining whether the display by the display terminal is accurate or not according to a comparison result — S104

FIG. 10

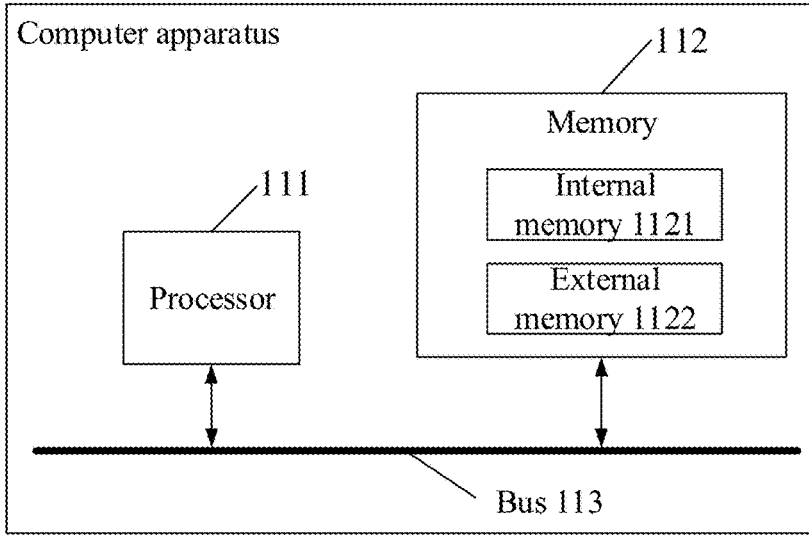

Computer apparatus

Memory 112

Processor 111

Internal memory 1121

External memory 1122

Bus 113

FIG. 11

MULTIMEDIA PLAYBACK MONITORING SYSTEM AND METHOD, AND ELECTRONIC APPARATUS

CROSS-REFERENCE TO RELATED APPLICATIONS

This is a National Phase Application filed under 35 U.S.C. 371 as a national stage of PCT/CN2022/115361 filed on Aug. 29, 2022, the entire content of which is incorporated herein by reference.

TECHNICAL FIELD

The present disclosure relates to the field of media transmission technology, and in particular, to a multimedia playback monitoring system, a multimedia playback monitoring method, and an electronic apparatus.

BACKGROUND

For issued multimedia content, playback situation of the multimedia content finally displayed on a display screen of a terminal may need to be monitored, and for example, the playback situation includes a case whether the multimedia content is adapted to the display screen, a case whether the multimedia content is displayed on time, whether the playback content is correct, and/or the like. In a conventional scheme, remote playback monitoring is carried out manually by point-by-point patrol, and thus this scheme has disadvantages of high labor cost, low monitoring efficiency, low detection accuracy rate, and low efficiency in executing a countermeasure when an error is detected in the displayed content. In another scheme, optical playback monitoring may be carried out by arranging a camera outside the display screen, and by realizing analysis and detection of multimedia contents through an algorithm; however, in this scheme, a playback monitoring camera needs to be configured for each display screen, the camera needs to be installed according to standards such as a specific height and a specific angle, and projects such as related structures and wiring of the camera during an installation process are often limited in an application scene; therefore, it is difficult to realize this scheme in project implementation.

SUMMARY

The present disclosure provides a multimedia playback monitoring system, a multimedia playback monitoring method, and an electronic apparatus.

In a first aspect, embodiments of the present disclosure provide a multimedia playback monitoring system, which includes an authentication image generator, a playback controller, an image compressor, and an analyzer, wherein:

the authentication image generator is configured to generate a first transparent image according to a display terminal, and embed first identification information generated in advance into the first transparent image through an information embedding algorithm to obtain an identity authentication image for a playback plan, the first identification information is configured to represent identity authentication information, and the identity authentication information is configured to represent the playback plan in a playback plan table;

the playback controller is configured to generate data to be displayed according to a received playback plan, a multimedia file corresponding to the playback plan, and the identity authentication image, and the data to be displayed is for being displayed by the display terminal;

the image compressor is configured to take a screenshot of a target image displayed by the display terminal and compress the screenshot to obtain compressed data; and the analyzer is configured to analyze the compressed data according to resolution information of the display terminal to obtain second identification information, compare the second identification information with the first identification information, and determine whether display by the display terminal is accurate or not according to a comparison result.

In some embodiments, the authentication image generator includes a first transparent image generation unit, a first data generation unit, a data embedding unit, and an image generation unit, and the first identification information includes first encoded data;

the first transparent image generation unit is configured to generate a first transparent image layer according to the resolution information of the display terminal, the first transparent image layer has a peripheral region and a central region surrounded by the peripheral region, display data of the central region is set as first preset data, and display data of the peripheral region is set as second preset data, thereby generating the first transparent image;

the first data generation unit is configured to encode the identity authentication information to obtain the first encoded data;

the data embedding unit is configured to embed the first encoded data into at least one first preset region in the first transparent image, and the at least one first preset region is located in the peripheral region; and the image generation unit is configured to set the first transparent image embedded with the first encoded data as the identity authentication image.

In some embodiments, the at least one first preset region includes two first preset regions oppositely disposed in the peripheral region; and the data embedding unit is configured to embed the first encoded data into each of the two first preset regions.

In some embodiments, the data embedding unit includes a division subunit, a data transformation subunit, and a data embedding subunit; and the image generation unit includes a data inverse transformation subunit and an image generation subunit;

the division subunit is configured to determine, according to a number of pixels of the first transparent image occupied by each first preset region and a data amount of the first encoded data, a first target pixel number required for hiding a piece of encoded subdata of the first encoded data; target pixels of which a number is equal to the first target pixel number occupy a first hiding sub-region in the first preset region;

the data transformation subunit is configured to perform discrete transformation on three channels of each target pixel in the first hiding sub-region to obtain a first discrete coefficient;

the data embedding subunit is configured to determine a first embedding component for the three channels according to the first discrete coefficient, a preset first embedding key, and the encoded subdata;

the data inverse transformation subunit is configured to perform inverse discrete transformation on the first embedding component for the three channels to obtain first hidden data located in the first hiding sub-region; and the image generation subunit is configured to set the first transparent image containing the first hidden data in each first hiding sub-region of the first preset region as the identity authentication image.

In some embodiments, the analyzer includes an analysis unit, a second data generation unit, and a comparison unit, and the second identification information includes second encoded data;

the analysis unit is configured to decompress the compressed data to obtain a decompressed image, position a first hiding sub-region in the decompressed image according to the resolution information of the display terminal, generate a second transparent image according to the display terminal, respectively extract a target pixel in the decompressed image and a target pixel in the second transparent image according to each first hiding sub-region, and analyze these target pixels to obtain the second encoded data;

the second data generation unit is configured to encode the identity authentication information to obtain the first encoded data; and the comparison unit is configured to compare the first encoded data with the second encoded data, and determine whether the display by the display terminal is accurate or not according to a comparison result.

In some embodiments, the analysis unit includes a step length determination subunit, a region positioning subunit, a second transparent image generation subunit, and an analysis subunit;

the step length determination subunit is configured to determine, according to the number of pixels of the first transparent image occupied by the first preset region and the data amount of the encoded data, the first target pixel number required for hiding a piece of encoded subdata of the first encoded data;

the region positioning subunit is configured to decompress the compressed data to obtain a decompressed image, position a first hiding sub-region in the decompressed image according to the resolution information of the display terminal and the first target pixel number;

the second transparent image generation subunit is configured to generate a second transparent image layer according to resolution information of the display terminal such that the second transparent image layer has a peripheral region and a central region surrounded by the peripheral region, set display data of the central region as first preset data, and set display data of the peripheral region as second preset data, thereby generating the second transparent image; and the analysis subunit is configured to, for a first hiding sub-region in the first preset region, extract each target pixel of the second transparent image located in the first hiding sub-region, perform discrete transformation on three channels of each target pixel to obtain a third discrete coefficient, extract each target pixel of the decompressed image located in the first hiding sub-region, perform discrete transformation on three channels of each target pixel to obtain a fourth discrete coefficient, and determine a piece of encoded subdata in the second encoded data according to the third discrete coefficient, the fourth discrete coefficient, and a preset first embedding key.

In some embodiments, the comparison unit is configured to: determine a first matching accuracy rate and a correlation coefficient between the first encoded data and the second encoded data, where the first matching accuracy rate is a ratio of a number of identical bits between the first encoded data and the second encoded data to the data amount of the first encoded data, and the correlation coefficient represents a relevancy between the first encoded data and the second encoded data; and determine that the display by the display terminal is correct if the first matching accuracy rate is greater than a first preset threshold and the correlation coefficient is greater than a second preset threshold.

In some embodiments, the first identification information further includes first hash data;

the first data generation unit is further configured to hash the first encoded data to obtain the first hash data;

the data embedding unit is further configured to embed the first hash data into at least one second preset region in the first transparent image, where the at least one second preset region is located in the peripheral region, and the at least one first preset region is adjacent to the at least one second preset region; and the image generation unit is configured to set the first transparent image embedded with the first encoded data and the first hash data as the identity authentication image.

In some embodiments, the at least one second preset region includes two second preset regions oppositely disposed in the peripheral region; and the data embedding unit is configured to embed the first hash data into each of the two second preset regions.

In some embodiments, the data embedding unit includes the division subunit, the data transformation subunit, and the data embedding subunit; and the image generation unit includes the data inverse transformation subunit and the image generation subunit;

the division subunit is configured to determine, according to a number of pixels of the first transparent image occupied by each second preset region and a data amount of the first hash data, a second target pixel number required for hiding a piece of hash subdata of the first hash data; target pixels of which a number is equal to the second target pixel number occupy a second hiding sub-region in the second preset region;

the data transformation subunit is configured to perform discrete transformation on three channels of each target pixel in the second hiding sub-region to obtain a second discrete coefficient;

the data embedding subunit is configured to determine a second embedding component for the three channels according to the second discrete coefficient, a preset second embedding key, and the hash subdata;

the data inverse transformation subunit is configured to perform inverse discrete transformation on the second embedding component for the three channels to obtain second hidden data located in the second hiding sub-region; and the image generation subunit is configured to set the first transparent image containing the first hidden data and the second hidden data that is in each second hiding sub-region of the second preset region as the identity authentication image.

In some embodiments, the analyzer includes an analysis unit, a second data generation unit, and a comparison unit, and the second identification information includes second encoded data and second hash data;

the analysis unit is configured to decompress the compressed data to obtain a decompressed image, position a first hiding sub-region and a second hiding sub-region in the decompressed image according to the resolution information of the display terminal, generate a second transparent image according to the display terminal, respectively extract a target pixel in the decompressed image and a target pixel in the second transparent image according to each first hiding sub-region, analyze these target pixels to obtain the second encoded data, respectively extract a target pixel in the decompressed image and a target pixel in the second transparent image according to each second hiding sub-region, and analyze these target pixels to obtain the second hash data;

the second data generation unit is configured to encode the identity authentication information to obtain the first encoded data, and hash the encoded data to obtain the first hash data; and the comparison unit is configured to: compare the first hash data with the second hash data, and determine whether the display by the display terminal is accurate or not according to a comparison result; if the display by the display terminal is determined to be incorrect, obtain the first encoded data and the second encoded data, compare the first encoded data with the second encoded data, and determine whether the display by the display terminal is accurate or not according to a comparison result.

In some embodiments, the analysis unit includes a step length determination subunit, a region positioning subunit, a second transparent image generation subunit, and an analysis subunit;

the step length determination subunit is configured to: determine, according to the number of pixels of the first transparent image occupied by the first preset region and the data amount of the encoded data, the first target pixel number required for hiding a piece of encoded subdata of the first encoded data; and determine, according to a number of pixels of the first transparent image occupied by the second preset region and a data amount of the hash data, a second target pixel number required for hiding a piece of hash subdata of the first hash data;

the region positioning subunit is configured to decompress the compressed data to obtain a decompressed image, position a first hiding sub-region in the decompressed image according to the resolution information of the display terminal and the first target pixel number, and position a second hiding sub-region in the decompressed image according to the resolution information of the display terminal and the second target pixel number;

the second transparent image generation subunit is configured to generate a second transparent image layer according to resolution information of the display terminal such that the second transparent image layer has a peripheral region and a central region surrounded by the peripheral region, set display data of the central region as first preset data, and set display data of the peripheral region as second preset data, thereby generating the second transparent image; and the analysis subunit is configured to: for a first hiding sub-region in the first preset region, extract each target pixel of the second transparent image located in the first hiding sub-region, perform discrete transformation on three channels of each target pixel to obtain a third discrete coefficient, extract each target pixel of the decompressed image located in the first hiding sub-region, perform discrete transformation on three channels of each target pixel to obtain a fourth discrete coefficient, determine a piece of encoded subdata in the second encoded data according to the third discrete coefficient, the fourth discrete coefficient, and a preset first embedding key; and for a second hiding sub-region in the second preset region, extract each target pixel of the second transparent image located in the second hiding sub-region, perform discrete transformation on three channels of each target pixel to obtain a fifth discrete coefficient, extract each target pixel of the decompressed image located in the second hiding sub-region, perform discrete transformation on three channels of each target pixel to obtain a sixth discrete coefficient, determine a piece of hash subdata in the second hash data according to the fifth discrete coefficient, the sixth discrete coefficient, and a preset second embedding key.

In some embodiments, the comparison unit is configured to: determine a second matching accuracy rate between the first hash data and the second hash data, where the second matching accuracy rate is a ratio of a number of identical bits between the first hash data and the second hash data to a data amount of the first hash data, determine that the display by the display terminal is correct if the second matching accuracy rate is greater than a third preset threshold; and if the display by the display terminal is determined to be incorrect, obtain the first encoded data and the second encoded data, determine a first matching accuracy rate and a correlation coefficient between the first encoded data and the second encoded data, where the first matching accuracy rate is a ratio of a number of identical bits between the first encoded data and the second encoded data to the data amount of the first encoded data, and the correlation coefficient represents a relevancy between the first encoded data and the second encoded data, and determine that the display by the display terminal is correct if the first matching accuracy rate is greater than a first preset threshold and the correlation coefficient is greater than a second preset threshold.

In a second aspect, embodiments of the present disclosure further provide a multimedia playback monitoring method, which includes:

generating a first transparent image according to a display terminal, and embedding first identification information generated in advance into the first transparent image through an information embedding algorithm to obtain an identity authentication image for a playback plan, wherein the first identification information is configured to represent identity authentication information, and the identity authentication information is configured to represent the playback plan in a playback plan table;

generating data to be displayed according to a received playback plan, a multimedia file corresponding to the playback plan, and the identity authentication image, wherein the data to be displayed is for being displayed by the display terminal;

taking a screenshot of a target image displayed by the display terminal and compressing the screenshot to obtain compressed data; and analyzing the compressed data according to resolution information of the display terminal to obtain second identification information, comparing the second identification information with the first identification information, and determining whether display by the display terminal is accurate or not according to a comparison result.

In a third aspect, embodiments of the present disclosure further provide a computer apparatus, which includes a processor, a memory, and a bus, wherein the memory stores therein machine-readable instructions executable by the processor, the processor and the memory communicate with each other through the bus when the computer apparatus operates, and the machine-readable instructions, when executed by the processor, causes the processor to perform steps of the multimedia playback monitoring method as described above.

In a fourth aspect, embodiments of the present disclosure further provide a non-transitory computer readable storage medium, which has a computer program stored thereon, wherein the computer program, when being executed by a processor, causes the processor to perform steps of the multimedia playback monitoring method as described above.

In a fifth aspect, embodiments of the present disclosure further provide an electronic apparatus, which includes a display terminal and the multimedia playback monitoring system according to any one of the foregoing embodiments.

BRIEF DESCRIPTION OF THE DRAWINGS

FIG. 8 is a schematic flowchart illustrating execution of an analyzing-comparing algorithm according to an embodiment of the present disclosure;

FIG. 9 is a schematic flowchart illustrating execution of a playback monitoring algorithm according to an embodiment of the present disclosure;

FIG. 10 is a schematic flowchart of a multimedia playback monitoring method according to an embodiment of the present disclosure; and FIG. 11 is a schematic diagram illustrating a structure of a computer apparatus according to an embodiment of the present disclosure.

DETAILED DESCRIPTION OF EMBODIMENTS

Figure 1:
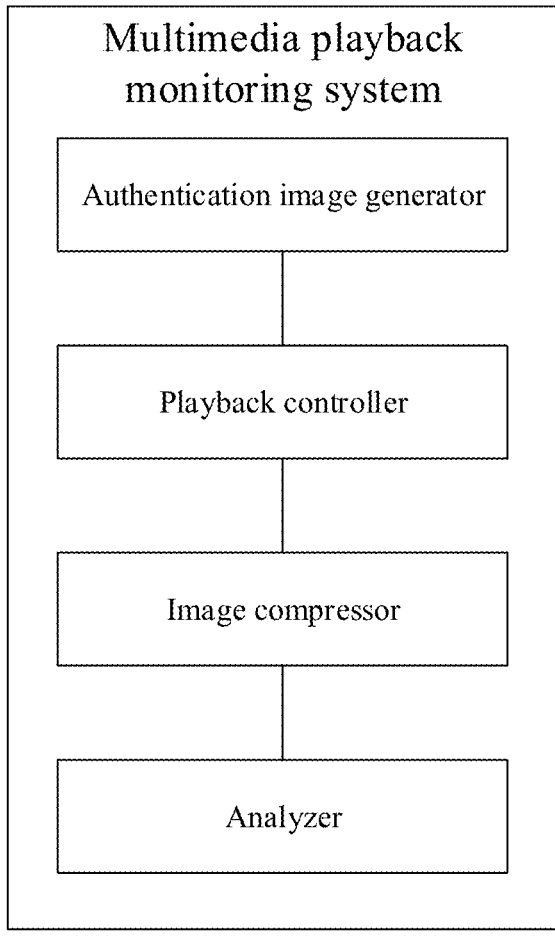
FIG. 1 is a schematic diagram of a multimedia playback monitoring system according to an embodiment of the present disclosure.

To make the objects, technical solutions and advantages of embodiments of the present disclosure more apparent, the technical solutions of the embodiments of the present disclosure will be described clearly and completely with reference to the drawings accompanying the embodiments of the present disclosure, and it is obvious that the described embodiments are only a part of embodiments of the present disclosure, not all embodiments of the present disclosure. Generally, the components of the embodiments of the present disclosure, as described and illustrated in the figures herein, could be arranged and designed in a wide variety of different configurations. Thus, the following detailed description of the embodiments of the present disclosure, provided in the accompanying drawings, is not intended to limit the scope of the present disclosure, as claimed, but is merely representative of selected embodiments of the present disclosure. All other embodiments, which can be derived by one of ordinary skill in the art from the embodiments of the present disclosure without making any inventive effort, shall fall within the protection scope of the present disclosure.

Unless defined otherwise, technical or scientific terms used herein shall have the ordinary meaning as understood by one of ordinary skill in the art to which this disclosure belongs. The use of "first", "second", and the like in this disclosure is not intended to indicate any order, quantity, or importance, but rather is used for distinguishing one element from another. Further, the use of the terms "a", "an", "the", or the like does not denote a limitation of quantity, but rather denotes the presence of at least one. The word "include", "comprise", or the like, means that the element or item preceding the word contains the element or item listed after the word and its equivalent, but does not exclude the presence of other elements or items. The term "connected", "coupled", or the like is not limited to physical or mechanical connections, but may include electrical connections, whether direct or indirect. The terms "upper", "lower", "left", "right", and the like are used only for indicating relative positional relationships, and when the absolute position of an object being described is changed, the relative positional relationships may also be changed accordingly.

The phrase "a plurality of" or "multiple" or "several" used in this disclosure means two or more. The phrase "and/or" describes the association relationship of the associated objects, indicating that there may be three relationships; for example, A and/or B, which may indicates the following three cases: A exists alone, A and B both exist, and B exists alone. The character "/" generally indicates that the preceding and following associated objects before and after the character "/" are in an "or" relationship.

Specific terms in the embodiments of the present disclosure are introduced in detail as follows.

1. ASCII (American Standard Code for Information Interchange) is a standard single byte character encoding scheme for text based data. An ASCII code uses a specified 7-bit or 8-bit binary number combination to represent 128 or 256 possible characters.

2. Unicode, also referred to as universal code or unified code, is an industry standard in the field of computer science, including character sets, coding schemes, etc. Unicode is generated to solve the limitation of the traditional character encoding schemes, and sets a uniform and unique binary code for each character in each language to meet the requirements of text transformation and processing in cross-language and cross-platform.

3. UTF-8 (8-bit, Universal Character Set/Unicode Transformation Format) is a variable length character encoding for Unicode. UTF-8 can be used to express any character in the Unicode standard, and the first byte in the UTF-8 code is still compatible with ASCII, such that the original software for processing ASCII character can be continuously used without modification or after only a minor modification.

4. DCT (Discrete Cosine Transform) is a kind of transform related to Fourier Transform, is similar to Discrete Fourier Transform (DFT), but uses only real numbers. DCT is commonly used for lossy data compression of signals and images, including pictures and video. An embodiment of the present disclosure utilizes the DCT transform to divide an image into small blocks formed by different frequencies, which are then quantized. During the quantization process, high frequency components are discarded, and the remaining low frequency components are saved for later image reconstruction.

5. MD5 Message-Digest Algorithm is a widely used cryptographic hash function, and can generate a 128-bit (16-byte) hash value, for ensuring the integrity of message transmission.

Researches show that in the related art, playback monitoring of multimedia contents includes remote playback monitoring that is carried out manually by point-by-point patrol, and thus this scheme has disadvantages of high labor cost, low monitoring efficiency, low detection accuracy rate, and low efficiency in executing a countermeasure when an error is detected in the displayed content. Alternatively, optical playback monitoring may be carried out by arranging a camera outside the display screen, and by realizing analysis and detection of multimedia contents through an algorithm; however, in this scheme, a playback monitoring camera needs to be configured for each display screen, the camera needs to be installed according to standards such as a specific height and a specific angle, and projects such as related structures and wiring of the camera during an installation process are often limited in an application scene; therefore, it is difficult to realize this scheme in project implementation.

In view of the foregoing, an embodiment of the present disclosure provides a multimedia playback monitoring system, which monitors the playback content of a display terminal in time without affecting the playback content of a multimedia file. Specifically, an information embedding algorithm embeds pre-generated first identification information into a first transparent image, where the first identification information serves as encryption information of identity authentication information, and is generated by using a preset algorithm, such that screenshot compression on a target image can be resisted subsequently. In addition, a screenshot of the target image is compressed and transmitted, the identity authentication accuracy rate can be guaranteed, meanwhile, the transmission bandwidth and data storage of compressed data are greatly reduced, the equipment loss is reduced, and the high-efficiency playback monitoring of multimedia contents are further achieved.

A multimedia playback monitoring system according to an embodiment of the present disclosure will be described in detail below.

In a first aspect, FIG. 1 is a schematic diagram of a multimedia playback monitoring system according to an embodiment of the present disclosure. As shown in FIG. 1, the multimedia playback monitoring system is configured to monitor display contents of a display terminal, so as to provide a user with a prompt of current display situation of the display terminal. The multimedia playback monitoring system includes an authentication image generator, a playback controller, an image compressor, and an analyzer, which will be further described below.

The authentication image generator is configured to generate an identity authentication image, and is specifically configured to generate a first transparent image according to the display terminal, and embed a first identification information generated in advance into the first transparent image through an information embedding algorithm, to obtain the identity authentication image for a playback plan.

Here, the first identification information is configured to represent identity authentication information, and the identity authentication information is used to represent a playback plan in a playback plan table. The identity authentication image is the first transparent image in which the first identification information is embedded. The first transparent image is generated according to the display terminal, and specifically may be generated according to resolution information (e.g., a resolution) of the display terminal, wherein the first transparent image has the same resolution as that of the display terminal.

It should be noted that not all pixels of the first transparent image are transparent, and the first transparent image has a peripheral region and a central region surrounded by the peripheral region, where the central region is completely transparent and the peripheral region is opaque. The first identification information may be embedded in the opaque peripheral region of the first transparent image, without affecting an image displayed on the display terminal subsequently.

It should be noted that each playback plan corresponds to one piece of identity authentication information, and each identity authentication information corresponds to one first identification information.

In an implementation, the first transparent image and the first identification information are used as input data of an information embedding algorithm, the information embedding algorithm embeds the obtained first identification information into the first transparent image to obtain the identity authentication image, and the authentication image generator sends the identity authentication image to the playback controller.

The playback controller is configured to generate data to be displayed according to the received playback plan, and a multimedia file and the identity authentication image that correspond to the playback plan, such that the data to be displayed is to be displayed by the display terminal. The data to be displayed specifically includes the playback plan, and the multimedia file and the identity authentication image that correspond to the playback plan.

The playback controller may send the data to be displayed to the display terminal through a High Definition Multimedia Interface (HDMI) for display. After receiving the data to be displayed, the display terminal plays back an image in the multimedia file superposed with the identity authentication image according to the playback plan.

The image compressor is configured to take a screenshot of a target image displayed by the display terminal and compress the screenshot of the target image, to obtain compressed data. Here, the target image is a display image of the image in the multimedia file superimposed with the identity authentication image. The multimedia playback monitoring system according to the present embodiment is additionally provided with the image compressor, and can compress the screenshot of the target image, such that in subsequent transmission of the compressed data, the transmission bandwidth and data storage can be greatly reduced, the equipment loss is reduced, and the transmission efficiency is improved.

The analyzer is configured to analyze the compressed data to determine whether the content displayed by the display terminal is accurate or not. Specifically, the analyzer is configured to analyze the compressed data according to resolution information of the display terminal to obtain second identification information, compare the second identification information with the first identification information, and determine whether the display by the display terminal (i.e., the content displayed by the display terminal) is accurate or not according to a comparison result.

Specifically, the compressed data is restored to obtain the target image, and the target image is analyzed to extract the embedded information in the target image, namely to extract the second identification information. If the multimedia file is not tampered in a transmission process, the current multimedia file is played back according to an issued playback plan, and the multimedia content is adapted to the display terminal, the comparison result indicates that the second identification information is the same as the first identification information, and it is determined that the display by the display terminal is accurate. If the multimedia file is tampered in the transmission process, or the current multimedia file is not played back according to the issued playback plan, or the multimedia content is not adapted to the display terminal, the comparison result indicates that the second identification information is different from the first identification information, and it is determined that the display content of the display terminal is inaccurate.

In some embodiments, the information embedding algorithm provided by the present disclosure embeds the first identification information generated in advance into the first transparent image, where the first identification information serves as encryption information of the identity authentication information, is generated by using a preset algorithm, and can resist the subsequent screenshot and compression of the target image. The first identification information includes first encoded data. The first encoded data is encoded data of the identity authentication information and can represent the identity authentication information, such that embedding the first encoded data in the first transparent image can realize identity authentication of the display content of the display terminal in a subsequent process.

The following further describes the authentication image generator, which includes a first transparent image generation unit, a first data generation unit, a data embedding unit, and an image generation unit.

The first transparent image generation unit is configured to generate a first transparent image layer according to the resolution information of the display terminal. The first transparent image layer has a peripheral region and a central region surrounded by the peripheral region. The first transparent image is generated by setting display data of the central region as first preset data, and setting display data of the peripheral region as second preset data.

In a specific implementation, the first transparent image generation unit is configured to generate, according to the resolution information of the display terminal, a first transparent image layer having four channels and having the same resolution as the resolution (including the number h of rows and the number w of columns) of the display terminal, and the four channels include an R channel, a G channel, a B channel, and an Alpha channel, where the R channel, the G channel, and the B channel represent colors of pixels in the display data, and the Alpha channel represents transparency of pixels in the display data. All pixels in the first transparent image layer are transparent.

Exemplarily, the first preset data may be set such that the colors (i.e., the R channel, the G channel, and the B-channel) thereof are filled with white and the Alpha channel thereof is 0 (i.e., completely transparent), and the second preset data may be set such that the colors (i.e., the R channel, the G channel, and the B channel) thereof are filled with grayscales of 10 to 245 and the Alpha channel thereof is 1 (i.e., opaque), so as to generate the first transparent image.

The first data generation unit is configured to encode the identity authentication information to obtain the first encoded data. Here, an encoding algorithm may include any one of the ASCII encoding, the Unicode encoding, or the UTF-8 encoding.

The identity authentication information is generated in advance, and specifically, the identity authentication information may be generated by encoding parameter information in the playback plan. The playback plan is a preset plan, and for example, the parameter information in the playback plan includes a playback plan identifier, an arrangement type of playback windows of the display terminal, the number of the playback windows, the number of multimedia files, an identifier of each multimedia file, a type of each multimedia file, an identifier of a playback window for playing back each multimedia file, a playing back sequence of each multimedia file, a number of times of cyclically playing back each multimedia file, and the like. The above parameter information is encoded to obtain the identity authentication information, as shown in Table 1. For example, a 32-base number (duotricemary notation) including 26 bits (i.e., a number having 32 as a base and including 26 bits) is used for encoding the parameter information. Bits $0$ to $5$ of the 26 bits represent the playback plan identifier, such as a name for the playback plan. Bit $6$ of the 26 bits represents a type of the playback plan, and for example, includes 1 representing normal playback, 2 representing black screen, 3 representing playing back advertisement images with the screen being turned off, and the like. Bit $7$ of the 26 bits represents the arrangement type of the playback windows, the arrangement type may be predefined (i.e., defined in advance) and changed, or may be customized when a plan is made and changed; and for example, Bit $7$ may be 1 representing one window, 2 representing two windows arranged horizontally, 3 representing two windows arranged vertically, 4 representing three windows arranged in one row horizontally, 5 representing three windows arranged in two rows of which a first row includes two windows and a second row includes one window, 6 representing three windows arranged in two rows of which a first row includes one window and a second row includes two windows, and 7 representing three windows arranged in three rows vertically. Bit $8$ of the 26 bits represents the type of each multimedia file, and the type of each multimedia file includes at least one of: video type, image type, text type, or audio type. The type of each multimedia file may be represented by a number, such as 1 representing the video type, i.e., being in .mp4 format; 2 representing the image type, i.e., being in .jpg format, or .png format; 3 representing the text type, e.g., being in .pptx format or .txt format; and 4 representing the audio format, i.e., being in .mp3 format. The multimedia files include, for example, advertisement videos, advertisement posters, bus route maps, bus schedules, notification announcement texts, etc. that may be displayed at a media terminal. Bits $9$ to $14$ of the 26 bits represent the identifier of each multimedia file, such as an Identity Document (ID) of a program. Bits $15$ to $17$ of the 26 bits represent the identifier of each playback window, e.g., an ID of each playback window. Bits $18$ to $21$ of the 26 bits represent a start time for playing back each multimedia file. Bits $22$ to $25$ of the 26 bits represent an end time for playing back each multimedia file.

TABLE 1

| | Bit | | | | | | | | |
|---|---|---|---|---|---|---|---|---|---|
| | 0~5 | 6 | 7 | 8 | 9~14 | 15~17 | 18~21 | 22~25 | ... |
| | | | | Meaning | | | | | |
| | playback plan identifier | type of playback plan | arrangement type of playback windows | type of multimedia file | identifier of multimedia file | identifier of playback window | start time | end time | |
| default value | X1 | 1 | 1 | 1 | Y1 | Z1 | 6:00 | 7:00 | |
| default value | X2 | 3 | 3 | 4 | Y2 | Z2 | 7:00 | 8:00 | |
| default value | X3 | 2 | 3 | 2 | Y3 | Z3 | 8:00 | 9:00 | |

Figure 2:
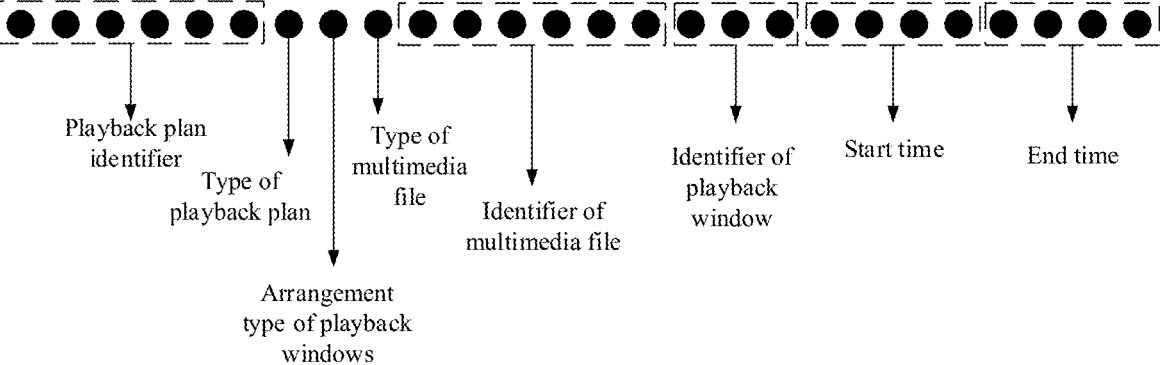
FIG. 2 is a schematic diagram of generated identity authentication information according to an embodiment of the present disclosure.

FIG. 2 is a schematic diagram of generated identity authentication information according to an embodiment of the present disclosure. As shown in FIG. 2, the identity authentication information is identity information of a playback plan formed by a character string of a 32-base number including bits 0 to 25 (i.e., 26 bits in total). The first data generation unit encodes the identity authentication information by using an encoding algorithm (i.e., any one of the ASCII encoding, the Unicode encoding, or the UTF-8 encoding) to obtain the first encoded data. The first encoded data is data represented by 0 and 1, which is more convenience to be embedded by using an algorithm.

The data embedding unit is configured to embed the first encoded data in at least one first preset region in the first transparent image, and the first preset region is located in the peripheral region. The first encoded data is embedded into the peripheral region of the first transparent image, thereby not affecting the display of the multimedia content on the display terminal.

Figure 3:
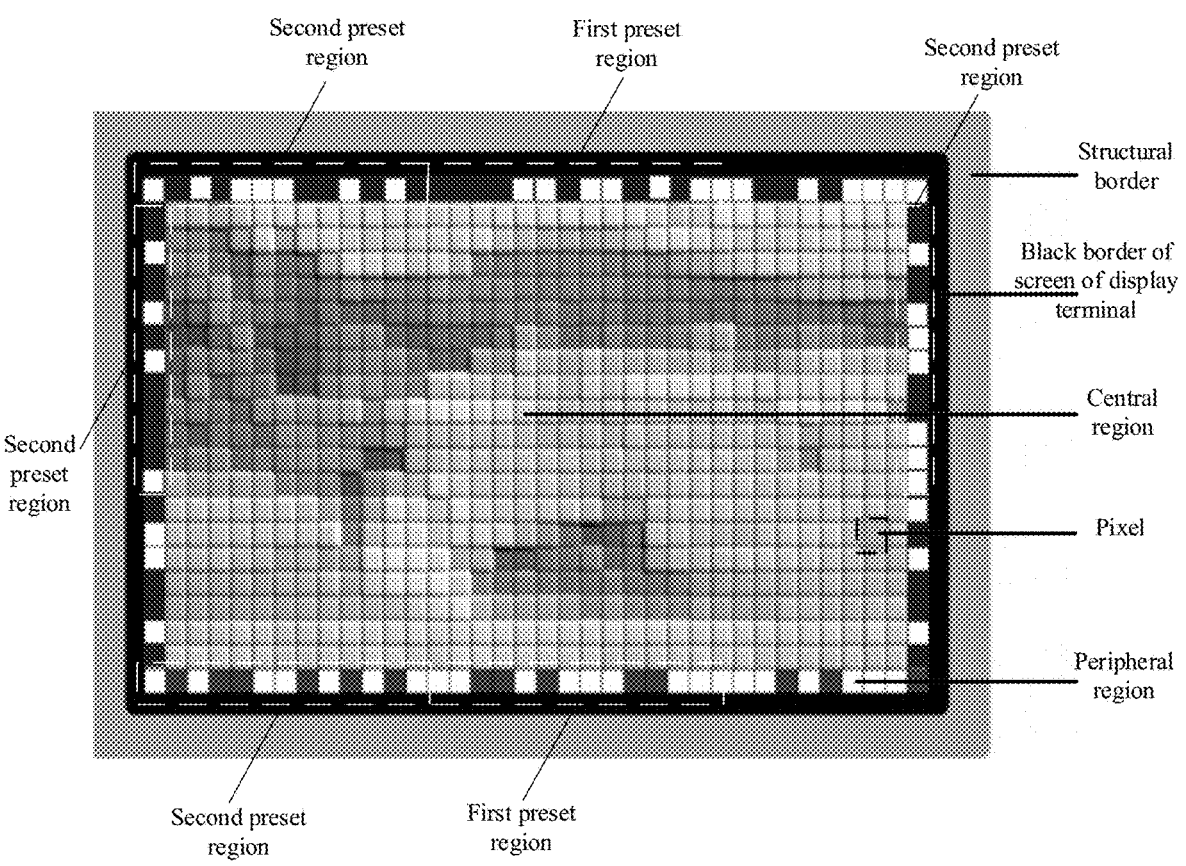
FIG. 3 is a schematic diagram of embedded regions according to an embodiment of the present disclosure.

FIG. 3 is a schematic diagram of embedded regions according to an embodiment of the present disclosure. As shown in FIG. 3, a width of the first preset region may be set to be one pixel, and a length of the first preset region ranges from min (w/2, h/2) to min (w, h), where min represents taking the minimum data in the related parentheses. Exemplarily, the same first encoded data may be embedded in a plurality of first preset regions.

In a case where textures of a part of images displayed by the display terminal are very complex, the encoded data in the identity authentication image superposed on the part of images may not be extracted. In order to avoid the problem that the encoded data cannot be extracted, in the present disclosure, the first encoded data may be embedded into a plurality of different first preset regions, so as to ensure that if textures of the other part of images are simple, the encoded data in the identity authentication image superposed on the other part of images can be extracted. A specific implementation is as follows. The at least one first preset region includes two regions oppositely arranged in the peripheral region, and the data embedding unit is configured to embed the first encoded data in both the two first preset regions. That is, in the present embodiment, the first encoded data is embedded into the first transparent image in a backup mode, such that the encoded data for identity authentication can be extracted in a subsequent analysis process, and the situation that authentication fails due to internal factors such as a display image is avoided.

The image generation unit is configured to set (or take) the first transparent image embedded with the first encoded data as the identity authentication image.

In the present embodiment, the first encoded data is embedded in the identity authentication image, and because the first encoded data has a relatively large compression resistance (i.e., is not easily damaged due to compression during a compression process), the first encoded data is used as the symbolic data for authenticating the identity of a multimedia file, such that a subsequent image compression can be resisted, and the situation that a subsequent identity authentication fails due to an internal factor of data compression is avoided.

In some examples, the data embedding unit includes a division subunit, a data transformation subunit, and a data embedding subunit. The image generation unit includes a data inverse transformation subunit and an image generation subunit. A detailed description of the subunits for completing the complete embedding of the first encoded data will be given below.

The division subunit is configured to determine a first target pixel number (i.e., the number of first target pixels) required for hiding encoded subdata of the first encoded data according to the number of pixels of the first transparent image occupied by each first preset region and a data amount of the first encoded data. Target pixels corresponding to the first target pixel number (i.e., target pixels of which the total number is equal to the first target pixel number) occupy a first hiding sub-region in the first preset region.

Here, the number of pixels of the first transparent image occupied by each first preset region is the number of pixels of the first transparent image surrounded by the width and the length of the first preset region, i.e., the width×the length, as exemplarily shown in FIG. 3. In a case where the first encoded data is obtained by using the ASCII encoding, the data amount of the first encoded data is 26×8; In a case where the first encoded data is obtained by using the Unicode coding, the data amount of the first encoded data is 26×P, where P is from 8 to 32 and P may be determined according to an actual encoding process; In a case where the first encoded data is obtained by using the UTF-8 encoding, the data amount of the first encoded data is 26×P, where P is from 8 to 32 and may be determined according to an actual encoding process. The data amount of the first encoded data is the number (or quantity or number of pieces) of encoded subdata contained in the first encoded data.

The length of the first preset region is divided by the data amount of the first encoded data, and the resultant quotient is rounded to obtain the maximum number Q1 of pixels used for hiding one piece of encoded subdata (i.e., one bit, 0 or 1, of the first encoded data). If Q1<4, the first target pixel number N1=1; if 4≤Q1<8, the first target pixel number N1=4; if Q1≥8, the first target pixel number N1=8. The first preset region includes a plurality of first hiding sub-regions, and N1 target pixels in each first hiding sub-region are used for hiding one piece of encoded subdata.

The data transformation subunit is configured to perform discrete transformation on three channels of each target pixel in the first hiding sub-region, to obtain a first discrete coefficient.

Figure 4:
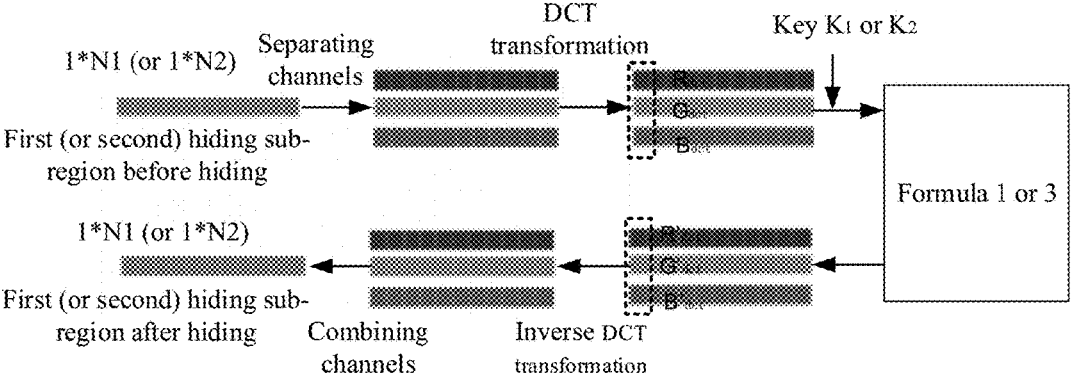
FIG. 4 is a schematic diagram of data hiding according to an embodiment of the present disclosure.

Description will be given by taking an example in which encoded subdata $M_i$ is hidden by using a first hiding sub-region i in the first preset region, and such description also applies to the case where another first hiding sub-region in the first preset region hides another piece of encoded subdata. FIG. 4 is a schematic diagram of data hiding according to an embodiment of the present disclosure. Specifically, as shown in FIG. 4, the data transformation subunit is configured to perform three-channel separation on 1×N1 pixels located in the first hiding sub-region i of the first transparent image, to obtain display data corresponding to the R channel, the G channel, and the B channel. Afterwards, DCT transformation is performed on each of the three channels to obtain N1 sets of DCT coefficients, in which the first set of DCT coefficients are low-frequency direct current (DC) components, denoted as $R_{dct\_1}$, $G_{dct\_1}$ and $B_{dct\_1}$, and the other coefficients are high-frequency components. In this disclosure, the low-frequency DC components are used for hiding encoded subdata $M_i$, and are referred to as the first discrete coefficient, i.e., $R_{dct\_1}$, $G_{dct\_1}$ and $B_{dct\_1}$.

The data embedding subunit is configured to determine a first embedding component for the three channels according to the first discrete coefficient, a preset first embedding key, and the encoded subdata. Here, the first embedding key $K_1$ may be set based on experience, and a value thereof is not limited in an embodiment of the present disclosure. The encoded subdata $M_i$ may be hidden, and the first embedding component, denoted as $R'_{dct\_1}$, $G'_{dct\_1}$ and $B'_{dct\_1}$, for the three channels, may be determined, according to the following Formula 1.

$$\begin{cases} R'_{dct\_1} = R_{dct\_1} + K_1 \times M_i \\ G'_{dct\_1} = G_{dct\_1} - K_1 \times M_i \\ B'_{dct\_1} = B_{dct\_1} + K_1 \times M_i \end{cases} \qquad \text{Formula 1}$$

The data inverse transformation subunit is configured to perform inverse discrete transformation on the first embedding component for the three channels, to obtain first hidden data located in the first hiding sub-region.

As shown in FIG. 4, the first embedding component $R'_{dct\_1}$, $G'_{dct\_1}$ and $B'_{dct\_1}$ for the three channels is processed by using the inverse operation of the DCT algorithm, to restore pixel data, and then the three channels are combined to obtain the first hidden data. At this time, a position occupied by the first hidden data is the same as a position of the target pixel of the first hiding sub-region before the encoded data is hidden.

A process that other encoded subdata is hidden by other first hiding sub-region in the first preset region is the same as the process described above, and thus detailed description thereof is omitted herein.

The image generation subunit is configured to set the first transparent image containing the first hidden data in each first hiding sub-region of the first preset region as the identity authentication image.

Figure 5:
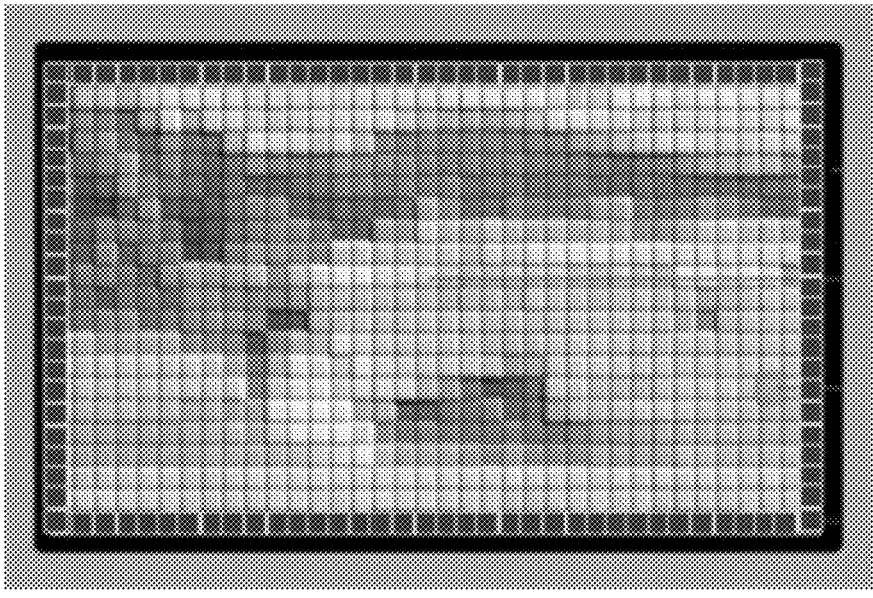
FIG. 5 is a schematic diagram of a display effect of a display terminal according to an embodiment of the present disclosure.

The display data in the first preset region of the identity authentication image is the first hidden data. FIG. 5 is a schematic diagram of a display effect of a display terminal according to an embodiment of the present disclosure. As shown in FIG. 5, the display terminal receives data to be displayed, and superimposes the identity authentication image on the screen, where a peripheral region of the identity authentication image is opaque and is filled with grayscales from 10 to 245, and includes the first hidden data of each encoded subdata. As can be seen from the display effect shown in FIG. 5, in the present embodiment, the encoded subdata is hidden as image frequency domain information by using the DCT transformation, such that the final display effect of the encoded subdata is less noticeable to human eyes while the multimedia playback monitoring is implemented, i.e., the viewing experience of the display image is enhanced.

The analyzer according to the present disclosure is configured to analyze the received compressed data, compare extracted information with original information, and determine whether the display by the display terminal is accurate or not. The determination mainly includes determining whether the multimedia file is tampered during a transmission process, determining whether the current multimedia file is played according to an issued playback plan, determining whether the multimedia content is adapted to the display terminal, and the like.

In some examples, the second identification information includes second encoded data. The analyzer includes an analysis unit, a second data generation unit, and a comparison unit. The units of the analyzer will be further described in detail below by taking an example where the second identification information includes the second encoded data.

The analysis unit is configured to decompress the compressed data to obtain a decompressed image; position (or locate) a first hiding sub-region in the decompressed image according to the resolution information of the display terminal; generate a second transparent image according to the display terminal; and respectively extract a target pixel in the decompressed image and a target pixel in the second transparent image according to each first hiding sub-region, and perform analysis thereon to obtain the second encoded data.

The analysis unit includes a step length determination subunit, a region positioning subunit, a second transparent image generation subunit, and an analysis subunit. The step length determination subunit is configured to determine a first target pixel number required for hiding one piece of encoded subdata of the first encoded data, according to the number of pixels of the first transparent image occupied by the first preset region and the data amount of the encoded data. The step length determination subunit obtains original identity authentication information, and encodes the identity authentication information to obtain the first encoded data. The analysis unit divides the preset length of the first preset region (i.e., the number of pixels of the first transparent image occupied by the first preset region) by the data amount of the first encoded data, and rounds the resultant quotient to obtain the maximum number Q1 of pixels used for hiding one piece of encoded subdata (e.g., one bit, 0 or 1, of the first encoded data). If $Q1<4$, the first target pixel number $N1=1$; if $4\leq Q1<8$, the first target pixel number $N1=4$; if $Q1\geq8$, the first target pixel number $N1=8$.

The region positioning subunit is configured to decompress the compressed data to obtain a decompressed image, and position the first hiding sub-region in the compressed data according to the resolution information of the display terminal and the first target pixel number. Exemplarily, the position of the first preset region in the decompressed image is determined according to the resolution information (including the number h of lines and the number w of columns)

of the display terminal and the preset length of the first preset region; and then, the first hiding sub-region in the first preset region is positioned according to the position of the first preset region in the decompressed image and the first target pixel number.

The second transparent image generation subunit is configured to generate a second transparent image layer according to the resolution information of the display terminal. The second transparent image layer has a peripheral region and a central region surrounded by the peripheral region. Display data of the central region is set as first preset data, and display data of the peripheral region is set as second preset data, thereby generating the second transparent image. Specifically, a second transparent image layer with four channels, which has the same resolution as the resolution (including the number h of rows and the number w of columns) of the display terminal, is generated according to the resolution information of the display terminal, and the four channels include an R channel, a G channel, a B channel, and an Alpha channel, where the R channel, the G channel, and the B channel represent colors of pixels in the display data, and the Alpha channel represents transparency of pixels in the display data. All pixels in the second transparent image layer are transparent. For example, the first preset data may be set such that the colors (i.e., the R channel, the G channel, and the B channel) are filled with white, and the Alpha channel is 0 (i.e., completely transparent). The second preset data may be set such that the colors (i.e., the R channel, the G channel, and the B channel) are filled with grayscales from 10 to 245, and the Alpha channel is 1 (i.e., opaque), so as to generate the second transparent image.

It should be noted that, the resolution of the second transparent image is the same as a resolution of an image resulted from the decompressed image being displayed.

The analysis subunit is configured to: extract, for a first hiding sub-region in the first preset region, each target pixel, which is located in the first hiding sub-region, of the second transparent image, and perform discrete transformation on three channels of each target pixel to obtain a third discrete coefficient; extract each target pixel, which is in the first hiding sub-region, of the decompressed image, and perform discrete transformation on three channels of each target pixel to obtain a fourth discrete coefficient; and determine a piece of encoded subdata in the second encoded data according to the third discrete coefficient, the fourth discrete coefficient and a preset first embedding key.

Figure 6:
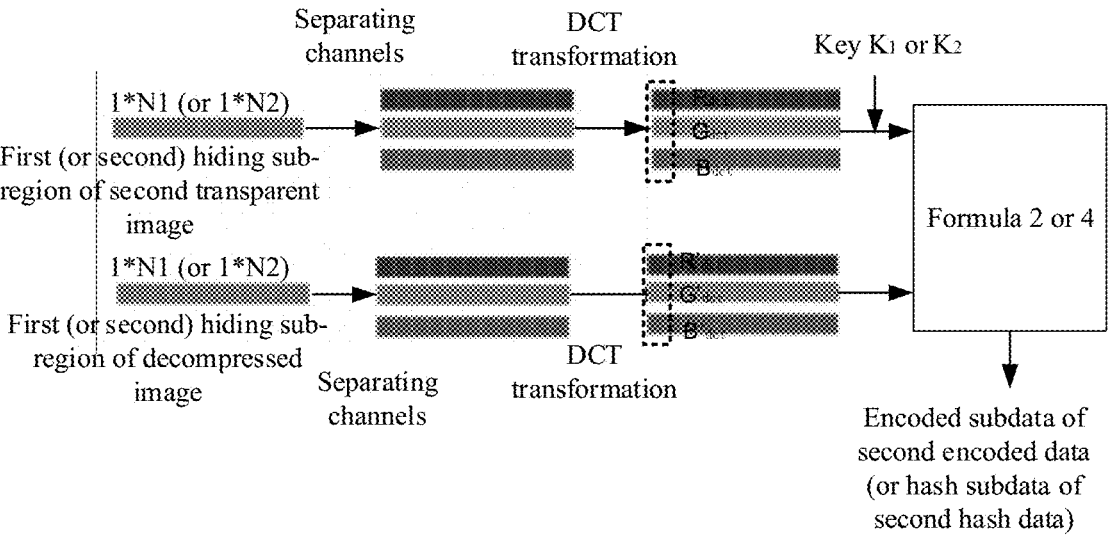
FIG. 6 is a schematic diagram of data extraction according to an embodiment of the present disclosure.

Here, description will be given by taking an example in which one piece of encoded subdata $M'_i$ in the second encoded data of the first preset region is extracted, and a method for extracting other encoded subdata hidden in other first hiding sub-region of the first preset region is the same. FIG. 6 is a schematic diagram of data extraction according to an embodiment of the present disclosure. Specifically, as shown in FIG. 6, the analysis subunit is configured to perform three-channel separation on $1 \times N1$ target pixels, which is located in a first hiding sub-region i, of the second transparent image to obtain display data corresponding to the R channel, the G channel, and the B channel. Afterwards, DCT transformation is performed on each of the three channels to obtain N1 sets of DCT coefficients, and a first set of the DCT coefficients, which is a low-frequency DC component and is denoted as $R_{dct\_3}$, $G_{dct\_3}$ and $B_{dct\_3}$, is obtained as the third discrete coefficient. It should be noted that since the display data in the peripheral region of the second transparent image is set as the second preset data, as which the display data in the peripheral region of the first transparent image, the third discrete coefficient is the same as the first discrete coefficient, i.e., $R_{dct\_3}=R_{dct\_1}$, $G_{dct\_3}=G_{dct\_1}$, and $B_{dct\_3}=B_{dct\_1}$. Three-channel separation is performed on $1 \times N1$ pixels of the decompressed image located in the first hiding sub-region i, to obtain display data corresponding to the R channel, the G channel, and the B channel. Afterwards, DCT transformation is performed on each of the three channels to obtain N1 sets of DCT coefficients, and a first set of DCT coefficients, which is a low-frequency DC component and is denoted as $R'_{dct\_4}$, $G'_{dct\_4}$ and $B'_{dct\_4}$, is obtained as the fourth discrete coefficient. Here, a key used for extracting encoded subdata $M'_i$ is the same as the first embedding key used for hiding encoded subdata $M_i$. The encoded subdata $M'_i$ is extracted according to the following Formula 2:

$$\begin{cases} M'_{i\_R} = \left(R'_{dct\_4} - R_{dct\_3}\right)/K_1 \\ M'_{i\_G} = \left(G_{dct\_3} - G'_{dct\_4}\right)/K_1 \\ M'_{i\_B} = \left(B'_{dct\_4} - B_{dct\_3}\right)/K_1 \end{cases} \qquad \text{Formula 2}$$

Afterwards, an average value of $M'_{i\_R}$, $M'_{i\_G}$ and $M'_{i\_G}$ is calculated as the encoded subdata $M'_i$ of the first hiding sub-region i. Alternatively, the encoded subdata extracted from any randomly selected one of the three channels mentioned above may be set as the encoded subdata $M'_i$ of the first hiding sub-region i.

It should be noted that if the content displayed by the display terminal is being played back according to the playback plan, the fourth discrete coefficient is the same as the first embedding component; if the content displayed by the display terminal is not played back according to the playback plan, i.e., the data to be displayed is tampered, the fourth discrete coefficient after being subjected to DCT transformation is changed, and is different from the embedded first embedding component.

A method for extracting other encoded subdata hidden in other first hiding sub-region in the first preset region is the same as the above method for extracting the encoded subdata $M'_i$ of the first hiding sub-region i, and thus detailed description thereof is omitted herein. It can be understood that by traversing the first hiding sub-regions of the first preset region, encoded subdata of each first hiding sub-region is extracted to form the second encoded data.

The second data generation unit is configured to encode the identity authentication information to obtain the first encoded data. It should be noted that an encoding method for the second data generation unit to encode the identity authentication information is the same as the encoding method for the first data generation unit to encode the identity authentication information as described in the foregoing examples. For example, if the first data generation unit encodes the identity authentication information by using the ASCII encoding, the second data generation unit also encodes the identity authentication information by using the ASCII encoding.

The comparison unit is configured to compare the first encoded data with the second encoded data, and determine whether the display by the display terminal is accurate according to a comparison result.

The extracted second encoded data and the extracted first encoded data are compared with each other. Specifically, it may be determined whether the display by the display terminal is accurate or not according to a first matching accuracy rate of the first encoded data and the second encoded data, and/or, according to a correlation coefficient of the first encoded data and the second encoded data. The first matching accuracy rate is a ratio of the number of identical bits between the first encoded data and the second encoded data to the data amount of the first encoded data. For example, each of the first encoded data and the second encoded data is 26×8 bits, the data amount of the first encoded data is 26×8=208, and if the number of identical bits between the first encoded data and the second encoded data is 182, the first matching accuracy rate F1=182/208=0.875.

The correlation coefficient is used for characterizing a relevancy between the first encoded data and the second encoded data. The correlation coefficient $$R = \max\left( r_i = \frac{\sum_i^M U_i * V_{i+k}}{\sqrt{\sum_i^M U_i^2} * \sqrt{\sum_i^M V_i^2}} \right),$$

where $r_i$ represents a correlation coefficient between the encoded subdata i in the first encoded data and the encoded subdata i in the second encoded data; M represents the data amount of the first encoded data or the second encoded data; $U_i$ represents the encoded subdata i in the first encoded data; $V_i$ represents the encoded subdata i in the second encoded data; $V_{i+k}$ represents the encoded subdata i+k in the second encoded data; max represents finding the maximum value in $r_i$; and k takes a value from 1 to M. It should be noted that during a calculation process, if data beyond an original data index range is used, its data supplementation (or data value) may be either zero or periodic topology, i.e., $V_{i+M}=V_i$.

In some examples, the comparison unit is configured to determine both the first matching accuracy rate and the correlation coefficient between the first encoded data and the second encoded data; if the first matching accuracy rate F1 is greater than a first preset threshold and the correlation coefficient R is greater than a second preset threshold, it is determined that the display by the display terminal is correct. Alternatively, if the first matching accuracy rate F1 is greater than the first preset threshold, it is determined that the display by the display terminal is correct. Alternatively, if the correlation coefficient R is greater than the second preset threshold, it is determined that the display by the display terminal is correct.

In some embodiments, since hash data generated by using the MD5 algorithm is sensitive to information change, for example, the hash data changes when the data to be displayed is slightly tampered, the embedding of the hash data in the first transparent image realizes more accurate identity authentication of the subsequent display content of the display terminal than that realized by the embedding of the encoded data in the first transparent image.

The detailed description of the embedding of first hash data realized by the authentication image generator will be given below.

The first data generation unit is further configured to hash (i.e., perform a hashing process on) the first encoded data to obtain first hash data. Here, the hashing process may be to generate a message digest D, i.e., the first hash data, which is a character string of 128 bits 0 and/or 1, on the first encoded data by using the MD5 algorithm.

The data embedding unit is further configured to embed the first hash data in at least one second preset region in the first transparent image. As shown in FIG. 3, the second preset region is located in the peripheral region, and the first preset region and the second preset region are adjacent to each other. A width of the second preset region may be set to be one pixel, and a length of the second preset region ranges from min (w/2, h/2) to min (w, h). For example, the same first hash data may be embedded in a plurality of second preset regions. FIG. 3 shows two sets of second preset regions, in which the opposite second preset regions are each embedded with the same first hash data.

In a case where the textures of a part of images displayed by the display terminal are very complex, the hash data superimposed on the identity authentication image in the part of images may not be extracted. In order to avoid the problem that the hash data cannot be extracted, the first hash data may be embedded into a plurality of different second preset regions according to an embodiment of the present disclosure, so as to ensure that if the textures of other part of images are simple, the hash data superimposed on the identity authentication image in the other part of images can be extracted. A specific implementation thereof is as follows: the plurality of second preset regions include two regions which are oppositely arranged in the peripheral region; the data embedding unit is further configured to embed the first hash data in each of the two second preset regions. In the present embodiment, the first hash data is embedded into the first transparent image in a backup mode, such that the hash data for identity authentication can be extracted in a subsequent analysis process, and the situation that authentication fails due to internal factors such as a display image is avoided.

The image generation unit is configured to set the first transparent image embedded with the first encoded data and the first hash data as the identity authentication image.

In the present embodiment, both the first encoded data and the first hash data are embedded in the identity authentication image, and the first encoded data has a larger compression resistance than the first hash data (i.e., the data is not easily damaged due to being compressed during a compression process), such that the first encoded data is used as symbolic data for authenticating the identity of a multimedia file, a subsequent image compression can be resisted, and the situation that a subsequent identity authentication fails due to the internal factor of data compression is avoided. Since the first hash data has the characteristics that the first hash data can be changed when the data to be displayed is slightly tampered, more accurate identity authentication of the subsequent display content of the display terminal is realized by embedding the first hash data in the first transparent image than the identity authentication realized by embedding the first encoded data in the first transparent image. In addition, the first hash data is 128-bit data that has a small data amount, such that a subsequent analysis process is faster, and the efficiency of analyzing and comparing data is improved.

In some examples, the data embedding unit includes the division subunit, the data transformation subunit, and the data embedding subunit. The image generation unit includes the data inverse transformation subunit and the image generation subunit. A detailed description of the subunits for completing the complete embedding of the first encoded data will be given below.

The division subunit is configured to determine a second target pixel number (i.e., the number of second target pixels) required for hiding one piece of hash subdata of the first hash data according to the number of pixels of the first transparent image occupied by the second preset region and the data amount of the first hash data. The target pixels of which the number is equal to the second target pixel number occupy a second hiding sub-region in the second preset region.

Here, the number of pixels of the first transparent image occupied by the second preset region, i.e., the number of pixels of the first transparent image surrounded by a width and a length of the second preset region, is equal to the width×the length, as exemplarily shown in FIG. 3. The data amount of the first hash data is the number of pieces of hash subdata included in the first hash data.

The length of the second preset region is divided by the data amount of the first hash data, and the resultant quotient is rounded to obtain the maximum number Q2 of pixels used for hiding one piece of hash subdata (i.e., one bit, 0 or 1, of the first hash data). If Q2<4, the second target pixel number N2=1; if 4≤Q2<8, the second target pixel number N2=4; if Q2≥8, the second target pixel number N2=8. The second preset region includes a plurality of second hiding sub-regions, and N2 target pixels in each second hiding sub-region are used for hiding one piece of hash subdata.

The data transformation subunit is configured to perform discrete transformation on three channels of each target pixel in the second hiding sub-region to obtain a second discrete coefficient.

Description will be given by taking an example in which the hash subdata Di is hidden in a second hiding sub-region j in the second preset region, and the same principle applies to the case where other encoded subdata is hidden in other second hiding sub-region in the second preset region. As shown in FIG. 4, specifically, the data transformation subunit is configured to perform three-channel separation on 1×N2 pixels of the first transparent image located in the second hiding sub-region j, to obtain display data corresponding to the R channel, the G channel, and the B channel. Afterwards, DCT transformation is performed on each of the three channels to obtain N2 sets of DCT coefficients, where a first set of DCT coefficients is a low-frequency DC component, denoted as $R_{dct\_2}$, $G_{dct\_2}$ and $B_{dct\_2}$, and other coefficients are high-frequency components. In an embodiment of the present disclosure, the low-frequency DC component is used for hiding the hash subdata $D_j$, and serves as the second discrete coefficient, i.e., $R_{dct\_2}$, $G_{dct\_2}$ and $B_{dct\_2}$.

The data embedding subunit is configured to determine a second embedding component for the three channels, according to the second discrete coefficient, a preset second embedding key, and the hash subdata. Here, the second embedding key $K_2$ may be set according to experience, and specific data thereof is not limited in an embodiment of the present disclosure. The hash subdata $D_j$ may be hidden, and the second embedding component for the three channels, denoted as $R'_{dct\_2}$, $G'_{dct\_2}$ and $B'_{dct\_2}$, may be determined according to the following Formula 3.

$$\begin{cases} R'_{dct\_2} = R_{dct\_2} + K_2 \times D_j \\ G'_{dct\_2} = G_{dct\_2} - K_2 \times D_j \\ B'_{dct\_2} = B_{dct\_2} + K_2 \times D_j \end{cases} \quad \text{Formula 3}$$

The data inverse transformation subunit is configured to perform inverse discrete transformation on the second embedding component for the three channels, to obtain second hidden data located in the second hiding sub-region. As shown in FIG. 4, the second embedding component $R'_{dct\_2}$, $G'_{dct\_2}$ and $B'_{dct\_2}$ for the three channels is processed to restore pixel data, by using the inverse operation of the DCT algorithm. Then, the three channels are combined to obtain the second hidden data. At this time, a position occupied by the second hidden data is the same as a position of the target pixel of the first hiding sub-region before the encoded data is hidden.

The principle for other hash subdata to be hidden in other second hiding sub-region in the second preset region is the same as that described above, and detailed description thereof is omitted herein.

The image generation subunit is configured to set the first transparent image containing the first hidden data and the second hidden data that is in each second hiding sub-regions of the second preset region, as the identity authentication image.

The display data of the first preset region in the identity authentication image is the first hidden data, and the display data of the second preset region in the identity authentication image is the second hidden data. As shown in FIG. 5, the display terminal receives data to be displayed, and superimposes the identity authentication image on a screen, where the peripheral region of the identity authentication image is opaque and is filled with grayscales from 10 to 245, and the peripheral region includes the first hidden data of each encoded subdata and the second hidden data of each hash subdata. As can be seen from the display effect shown in FIG. 5, in the present embodiment, the encoded subdata and the hash subdata are both hidden as image frequency domain information by using the DCT transformation, such that the final display effect is less noticeable to human eyes while the multimedia playback monitoring is implemented, i.e., the viewing experience of the display image is enhanced.

Figure 7:
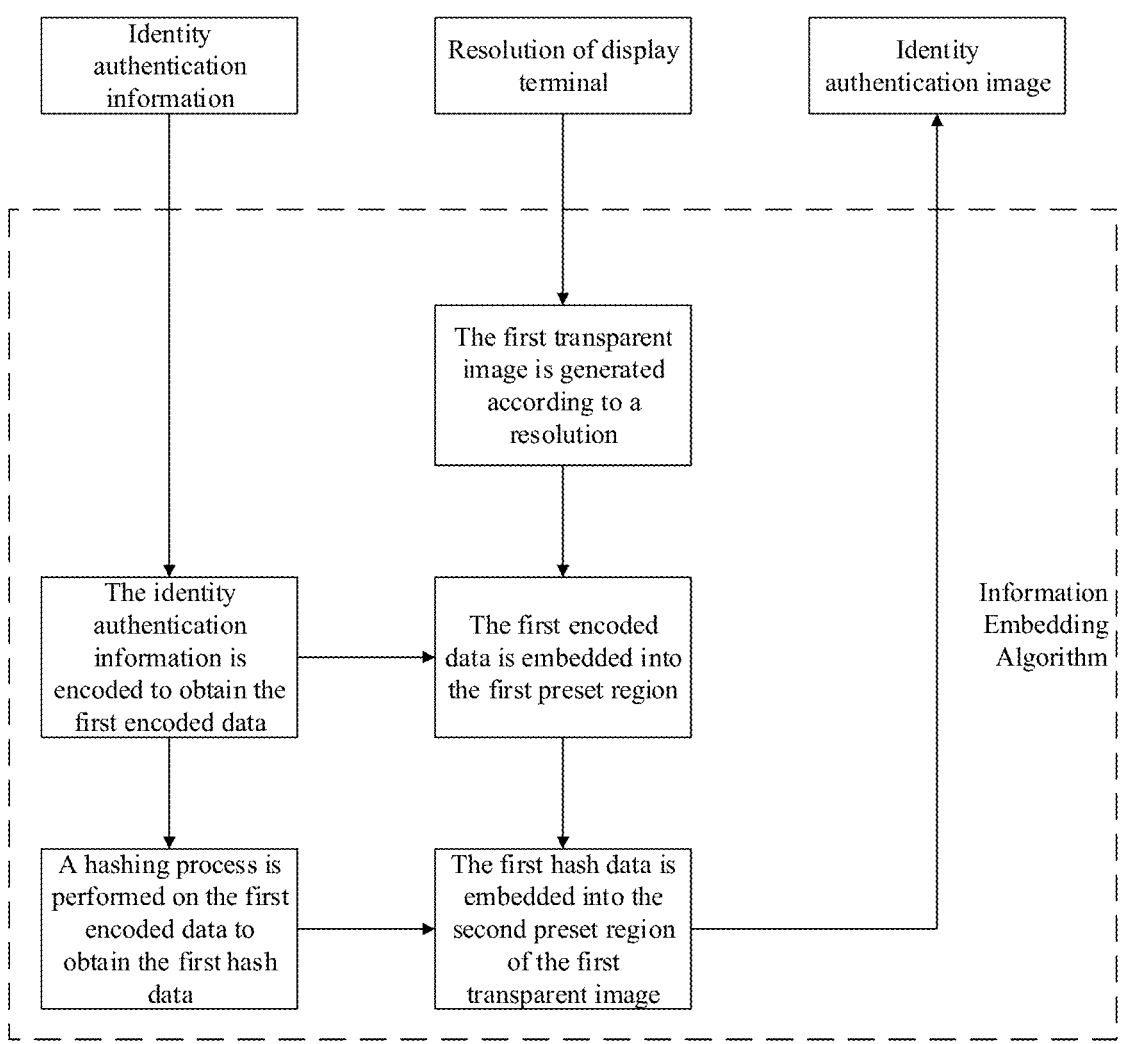
FIG. 7 is a schematic flowchart illustrating execution of an information embedding algorithm according to an embodiment of the present disclosure.

FIG. 7 is a schematic flowchart illustrating execution of an information embedding algorithm according to an embodiment of the present disclosure. As shown in FIG. 7, the identity authentication image is generated for the embedding of the first encoded data and the first hash data. Specifically, identity authentication information and the resolution of the display terminal are input into the information embedding algorithm, and the identity authentication information is encoded to obtain the first encoded data; and then, a hashing process is performed on the first encoded data to obtain the first hash data. The first transparent image layer is generated according to the resolution information of the display terminal; the first transparent image layer has the peripheral region and the central region surrounded by the peripheral region; the display data of the central region is set as the first preset data, and the display data of the peripheral region is set as the second preset data, to generate the first transparent image. Then, the first encoded data is embedded into the first preset region of the first transparent image, and the first hash data is embedded into the second preset region of the first transparent image, to obtain the identity authentication image.

The analyzer provided by the present disclosure is configured to analyze the received compressed data, compare the extracted information with the original information, and determine whether the display by the display terminal is accurate or not. The determination mainly includes determining whether the multimedia file is tampered during a transmission process, determining whether the current multimedia file is played back according to an issued playback plan, determining whether the multimedia content is adapted to the display terminal, and the like.

In some examples, the second identification information includes the second encoded data and second hash data. The analyzer includes the analysis unit, the second data generation unit, and the comparison unit. The units of the analyzer will be further described in detail below by taking an example where the second identification information includes the second encoded data.

The analysis unit is configured to decompress the compressed data to obtain a decompressed image; position (or locate) a first hiding sub-region in the decompressed image according to the resolution information of the display terminal; generate a second transparent image according to the display terminal; respectively extract a target pixel in the decompressed image and a target pixel in the second transparent image according to each first hiding sub-region, and perform analysis thereon to obtain the second encoded data; and respectively extract a target pixel in the decompressed image and a target pixel in the second transparent image according to each second hiding sub-region, and perform analysis thereon to obtain the second hash data.

The analysis unit includes a step length determination subunit, a region positioning subunit, a second transparent image generation subunit, and an analysis subunit. The step length determination subunit is configured to determine a first target pixel number required for hiding one piece of encoded subdata of the first encoded data, according to the number of pixels of the first transparent image occupied by the first preset region and the data amount of the encoded data, and determine a second target pixel number required for hiding one piece of hash subdata of the first hash data according to the pixel number of the first transparent image occupied by the second preset region and the data amount of the hash data.

The step length determination subunit obtains original identity authentication information, and encodes the identity authentication information to obtain the first encoded data. The analysis unit divides the preset length of the first preset region (i.e., the number of pixels of the first transparent image occupied by the first preset region) by the data amount of the first encoded data, and rounds the resultant quotient to obtain the maximum number $Q1$ of pixels used for hiding one piece of encoded data (i.e., one bit, 0 or 1, of the first encoded data), thereby determining the first target pixel number $N1$, where $N1$ is 1, 4 or 8. Meanwhile, the step length determination subunit further hashes (i.e., performs a hashing process on) the first encoded data to obtain the first hash data. The analysis unit divides the preset length of the second preset region (i.e. the number of pixels of the first transparent image occupied by the second preset region) by the data amount of the first hash data, and rounds the resultant quotient to obtain the maximum number $Q2$ of pixels used for hiding one piece of hash subdata (i.e., one bit, 0 or 1, of the first hash data), thereby determining a second target pixel number $N2$, where $N2$ is 1, 4 or 8.

The region positioning subunit is configured to decompress the compressed data to obtain a decompressed image; position a first hiding sub-region in the decompressed image according to the resolution information of the display terminal and the first target pixel number; and position a second hiding sub-region in the decompressed image according to the resolution information of the display terminal and the second target pixel number. Exemplarily, the position of the first preset region in the decompressed image is determined according to the resolution information (including the number h of lines and the number w of columns) of the display terminal and the preset length of the first preset region; and then, a first hiding sub-region in the first preset region is positioned according to the position of the first preset region in the decompressed image and the first target pixel number. The position of the second preset region in the decompressed image is determined according to the resolution information (including the line number h and the column number w) of the display terminal and the preset length of the second preset region; and then, a second hiding sub-region in the second preset region is positioned according to the position of the second preset region in the decompressed image and the second target pixel number.

The second transparent image generation subunit is configured to generate a second transparent image layer according to the resolution information of the display terminal, where the second transparent image layer has a peripheral region and a central region surrounded by the peripheral region; set display data of the central region as first preset data; and set display data of the peripheral region as second preset data, thereby generating a second transparent image. Specifically, a second transparent image layer which has four channels and has the same resolution as the resolution (including the number h of rows and the number w of columns) of the display terminal is generated, according to the resolution information of the display terminal, where the four channels include an R channel, a G channel, a B channel, and an Alpha channel, the R channel, the G channel, and the B channel represent colors of pixels in the display data, and the Alpha channel represents transparency of pixels in the display data. All pixels in the second transparent image layer are transparent. For example, the first preset data may be set such that the colors (i.e., the R channel, the G channel, and the B channel) are filled with white and the Alpha channel is 0 (i.e., completely transparent). The second preset data may be set such that the colors (i.e., the R channel, the G channel, and the B channel) are filled with grayscales from 10 to 245, and the Alpha channel is 1 (i.e., opaque), thereby generating the second transparent image.

It should be noted that the resolution of the second transparent image is the same as a resolution of an image resulted from the decompressed image being displayed.

The analysis subunit is configured to: for a first hiding sub-region in the first preset region, extract each target pixel of the second transparent image located in the first hiding sub-region, and perform discrete transformation on three channels of each target pixel to obtain a third discrete coefficient; extract each target pixel of the decompressed image located in the first hiding sub-region, and perform discrete transformation on three channels of each target pixel to obtain a fourth discrete coefficient; determine one piece of code subdata in the second encoded data according to the third discrete coefficient, the fourth discrete coefficient, and a preset first embedding key; for a second hiding sub-region in the second preset region, extract each target pixel of the second transparent image located in the second hiding sub-region, and perform discrete transformation on three channels of each target pixel to obtain a fifth discrete coefficient; extract each target pixel of the decompressed image located in the second hiding sub-region, and perform discrete transformation on three channels of each target pixel to obtain a sixth discrete coefficient; and determine one piece of hash subdata in the second hash data according to the fifth discrete coefficient, the sixth discrete coefficient, and a preset second embedding key.

Here, detailed description of extracting a piece of encoded subdata $M'_i$ of the second encoded data located in the first preset region may be referred to the implementation related to the analysis subunit in the foregoing examples, and repeated description thereof is omitted herein. Description will be given by taking an example in which a hash subdata $D'_j$ of the second hash data located in the second preset region is extracted, and the extraction of another piece of hash subdata hidden in another second hiding sub-region of the second preset region may be carried out in the same way. As shown in FIG. 6, specifically, the analysis subunit is configured to perform three-channel separation on 1×N2 target pixels of the second transparent image located in the second hiding sub-region j, to obtain display data corresponding to the R channel, the G channel, and the B channel. Afterwards, DCT transformation is performed on each of the three channels to obtain N2 sets of DCT coefficients, and a first set of DCT coefficients, which is a low-frequency DC component and is denoted as $R_{dct\_5}$, $G_{dct\_5}$ and $B_{dct\_5}$, is obtained as the fifth discrete coefficient. It should be noted that since the display data in the peripheral region of the second transparent image is set as the second preset data, which is the same as the display data in the peripheral region of the first transparent image, the fifth discrete coefficient is the same as the second discrete coefficient, i.e., $R_{dct\_5}=R_{dct\_2}$, $G_{dct\_5}=G_{dct\_2}$ and $B_{dct\_5}=B_{dct\_2}$. Three-channel separation is performed on 1×N2 pixels of the decompressed image located in the second hiding sub-region j, to obtain display data corresponding to the R channel, the G channel, and the B channel. Afterwards, DCT transformation is performed on each of the three channels to obtain N2 sets of DCT coefficients, and a first set of DCT coefficients, which is a low-frequency DC component and is denoted as $R'_{dct\_6}$, $G'_{dct\_6}$ and $B'_{dct\_6}$, is obtained as the sixth discrete coefficient. Here, a key used for extracting the hash subdata $D'_j$ is the same as the second embedding key used for hiding the hash subdata $D'_j$. The hash subdata $D'_j$ is extracted according to the following Formula 4.

$$\begin{cases} D'_{j\_R} = \left(R'_{dct\_6} - R_{dct\_5}\right)/K_2 \\ D'_{j\_G} = \left(G_{dct\_5} - G'_{dct\_6}\right)/K_2 \\ D'_{j\_B} = \left(B'_{dct\_6} - B_{dct\_5}\right)/K_2 \end{cases} \qquad \text{Formula 4}$$

Afterwards, an average value of $D'_{j\_R}$, $D'_{j\_G}$ and $D'_{j\_B}$ may be calculated as the hash subdata $D'_j$ of the second hiding sub-region j. Alternatively, the hash subdata extracted from any one randomly selected from the three channels mentioned above may be set as the hash subdata $D'_j$ of the second hiding sub-region j.

It should be noted that if the content displayed by the display terminal is being played back according to the playback plan, the sixth discrete coefficient is the same as the second embedding component; if the content displayed by the display terminal is not played back according to the playback plan, i.e., the data to be displayed is tampered, the sixth discrete coefficient after being subjected to DCT transformation is changed, and is different from the embedded second embedding component.

A method for extracting another piece of hash subdata hidden in another second hiding sub-region of the second preset region is the same as the method for extracting the hash subdata $D'_j$ from the second hiding sub-region j as described above, and thus detailed description thereof is omitted herein. It can be understood that by traversing the second hiding sub-regions of the second preset region, the hash subdata of each second hiding sub-region is extracted, thereby forming the second hash data.

The second data generation unit is configured to encode the identity authentication information to obtain first encoded data; and hash (i.e., perform a hashing process on) the first encoded data to obtain first hash data. It should be noted that an encoding method for the second data generation unit to encode the identity authentication information is the same as the encoding method for the first data generation unit to encode the identity authentication information as described in the foregoing examples.

The comparison unit is configured to compare the first hash data with the second hash data, and determine whether the display by the display terminal is accurate according to a comparison result; if the display by the display terminal is determined to be incorrect, obtain the first encoded data and the second encoded data, compare the first encoded data with the second encoded data, and determine whether the display by the display terminal is accurate or not according to a comparison result.

Here, whether the display by the display terminal is accurate or not may be determined, by comparing the first hash data with the second hash data, and specifically, according to a second matching accuracy rate of the first hash data and the second hash data. The second matching accuracy rate is a ratio of the number of identical bits between the first hash data and the second hash data to the data amount of the first hash data. If the second matching accuracy rate is greater than a third preset threshold, it is determined that the display by the display terminal is correct; and if the second matching accuracy rate is less than or equal to the third preset threshold, it is determined that the display by the display terminal is incorrect. For example, each of the first hash data and the second hash data is 128 bits, the data amount of the first hash data is 128 bits, and if the number of identical bits between the first hash data and the second hash data is 100, the second matching accuracy rate $F2=126/128=0.984>$ the third preset threshold, and it is determined that the display by the display terminal is correct. On the other hand, if the display by the display terminal is determined to be incorrect, the first encoded data and the second encoded data are obtained and compared with each other, and whether the display by the display terminal is accurate or not may be determined according to the first matching accuracy rate of the first encoded data and the second encoded data, and/or, according to the correlation coefficient of the first encoded data and the second encoded data. Exemplarily, if the first matching accuracy rate is greater than the first preset threshold and the correlation coefficient is greater than the second preset threshold, it is determined that the display by the display terminal is correct. Here, a detailed comparison of the first encoded data with the second encoded data may be referred to the comparison of the second encoded data with the first encoded data made by the comparison unit, and repeated description thereof is omitted herein.

FIG. 8 is a schematic flowchart illustrating execution of an analyzing-comparing algorithm according to an embodiment of the present disclosure. As shown in FIG. 8, the analyzing-comparing algorithm may be executed in the analyzer. For the execution process of the analyzer, specifically, the identity authentication information, the resolution of the display terminal, and the compressed data are input into the analyzing-comparing algorithm, and the identity authentication information is encoded to obtain the first encoded data; and then, a hashing process is performed on the first encoded data to obtain the first hash data. The first target pixel number required for hiding one piece of encoded subdata of the first encoded data, and the second target pixel number required for hiding one piece of hash subdata of the first hash data, are calculated according to the resolution of the display terminal. Then, the first hiding sub-region and the second hiding sub-region are positioned in the decompressed image, the encoded subdata in the second encoded data is extracted from the first hiding sub-region, and the hash subdata in the second hash data is extracted from the second hiding sub-region. Then, the first hash data and the second hash data are compared with each other, and whether the display by the display terminal is correct is determined according to the comparison result. If the display by the display terminal is correct, information of successful comparison is output; otherwise, the first encoded data and the second encoded data are continuously compared with each other, and whether the display by the display terminal is correct is determined according to this comparison result. If the display by the display terminal is correct, information of successful comparison is output; otherwise, information of comparison failure is output.

FIG. 9 is schematic flowchart illustrating execution of a playback monitoring algorithm according to an embodiment of the present disclosure. As shown in FIG. 9, the playback monitoring algorithm may be executed in the multimedia playback monitoring system. For the execution process of each component of the multimedia playback monitoring system, specifically, the identity authentication information is input into the information embedding algorithm, and the identity authentication image is output; the identity authentication image is transmitted in .png format, and is superposed on an upper layer of a screen of the display terminal, the screen displaying the multimedia file corresponding to the playback plan; thereafter, a screenshot of the screen is taken regularly and compressed, and then transmitted in .jpg format to the analyzing-comparing algorithm, and a comparison result is output.

In a second aspect, an embodiment of the present disclosure further provides a multimedia playback monitoring method, and FIG. 10 is a schematic flowchart of the multimedia playback monitoring method according to the present embodiment. As shown in FIG. 10, the multimedia playback monitoring method includes the following steps S101 to S104.

Step S101 includes generating the first transparent image according to the display terminal, and embedding the first identification information generated in advance into the first transparent image through the information embedding algorithm to obtain the identity authentication image for a playback plan, where the first identification information is used for representing the identity authentication information, and the identity authentication information is used for representing the playback plan in the playback plan table.

A specific implementation of this step may be referred to the execution process of the authentication image generator of the multimedia playback monitoring system, and repeated description thereof is omitted herein.

Step S102 includes generating data to be displayed according to the received playback plan, the multimedia file corresponding to the playback plan, and the identity authentication image, for being displayed by the display terminal.

A specific implementation of this step may be referred to the execution process of the playback controller of the multimedia playback monitoring system, and repeated description thereof is omitted herein.

Step S103 includes taking a screenshot of the target image displayed by the display terminal, and compressing the screenshot to obtain the compressed data.

A specific implementation of this step may be referred to the execution process of the image compressor of the multimedia playback monitoring system, and repeated description thereof is omitted herein.

Step S104 includes analyzing the compressed data according to the resolution information of the display terminal to obtain the second identification information, comparing the second identification information with the first identification information, and determining whether the display by the display terminal is accurate or not according to a comparison result.

A specific implementation of this step may be referred to the execution process of the analyzer of the multimedia playback monitoring system, and repeated description thereof is omitted herein.

In some examples, a specific implementation of step S101 may include the following steps S101-1 to S101-4.

Step S101-1 includes: generating the first transparent image layer according to the resolution information of the display terminal, where the first transparent image layer has the peripheral region and the central region surrounded by the peripheral region; setting the display data of the central region as the first preset data, and setting the display data of the peripheral region as the second preset data, thereby generating the first transparent image.

Step S101-2 includes encoding the identity authentication information to obtain the first encoded data; and hashing (i.e., performing a hashing process on) the first encoded data to obtain the first hash data.

Step S101-3 includes embedding the first encoded data into at least one first preset region in the first transparent image, and embedding the first hash data into at least one second preset region in the first transparent image, where the first preset region and the second preset region are both located in the peripheral region, and are adjacent to each other.

Step S101-4 includes setting the first transparent image embedded with the first encoded data and the first hash data as the identity authentication image.

Specific implementations of the steps S101-1 to S101-4 may be referred to the execution processes of the first transparent image generation unit, the first data generation unit, the data embedding unit, and the image generation unit of the authentication image generator, and repeated description thereof is omitted herein.

In some examples, a specific implementation of step S101-4 includes the following steps S101-4-1 to S101-4-8.

Step S101-4-1 includes decompressing the compressed data to obtain a decompressed image.

Step S101-4-2 includes positioning the first hiding sub-region and the second hiding sub-region in the decompressed image according to resolution information of the display terminal.

Step S101-4-3 includes generating a second transparent image according to the display terminal.

Step S101-4-4 includes respectively extracting a target pixel in the decompressed image and a target pixel in the second transparent image according to each first hiding sub-region, and analyzing these target pixels to obtain the second encoded data; respectively extracting a target pixel in the decompressed image and a target pixel in the second transparent image according to each second hiding sub-region, and analyzing these target pixels to obtain the second hash data.

Step S101-4-5 includes encoding the identity authentication information to obtain the first encoded data; and hashing the first encoded data to obtain the first hash data.

Step S101-4-6 includes comparing the first hash data with the second hash data, and determining whether the display by the display terminal is accurate or not according to a comparison result.

Step S101-4-7 includes, if the display by the display terminal is determined to be incorrect, obtaining the first encoded data and the second encoded data.

Step S101-4-8 includes comparing the first encoded data with the second encoded data, and determining whether the display by the display terminal is accurate or not according to a comparison result.

Specific implementations of the steps S101-4-1 to S101-4-8 may be referred to the execution processes of the analysis unit, the second data generation unit, and the comparison unit of the analyzer, and repeated description thereof is omitted herein.

In a third aspect, based on the same technical concept, an embodiment of the present application further provides a computer apparatus, as shown in FIG. 11, which is a schematic diagram illustrating a structure of the computer apparatus according to the present embodiment.

The computer apparatus includes a processor 111, a memory 112, and a bus 113. The memory 112 stores therein machine-readable instructions executable by the processor 111. The processor 111 is configured to execute the machine-readable instructions stored in the memory 112, and when being executed by the processor 111, the machine-readable instructions cause the processor 111 to perform the following steps S101 to S104. Step S101 includes generating the first transparent image according to the display terminal, and embedding the first identification information generated in advance into the first transparent image through the information embedding algorithm to obtain the identity authentication image for a playback plan, where the first identification information is used for representing the identity authentication information, and the identity authentication information is used for representing the playback plan in the playback plan table. Step S102 includes generating data to be displayed according to the received playback plan, the multimedia file corresponding to the playback plan, and the identity authentication image, for being displayed by the display terminal. Step S103 includes taking a screenshot of the target image displayed by the display terminal, and compressing the screenshot to obtain the compressed data. Step S104 includes analyzing the compressed data according to the resolution information of the display terminal to obtain the second identification information, comparing the second identification information with the first identification information, and determining whether the display by the display terminal is accurate or not according to a comparison result.

The memory 112 includes an internal memory 1121 and an external memory 1122. The internal memory 1121 is also referred to as a main memory, and is used for temporarily storing operation data in the processor 111 and data exchanged with an external memory 1122 such as a hard disk. The processor 111 exchanges data with the external memory 1122 through the internal memory 1121, and when the computer apparatus operates, the processor 111 and the memory 112 communicate with each other through the bus 113, such that the processor 111 executes the execution instructions as described in the foregoing method embodiments.

In a fourth aspect, embodiments of the present disclosure further provide a non-transitory computer readable storage medium having a computer program stored thereon, and when being executed by a processor, the computer program causes the processor to perform the steps of the multimedia playback monitoring method as described in the foregoing method embodiments. This storage medium may be a volatile or non-volatile non-transitory computer readable storage medium.

In a fifth aspect, an embodiment of the present disclosure further provides an electronic apparatus, which includes the multimedia playback monitoring system according to any one of the foregoing embodiments and a display terminal.

It will be understood that the above embodiments are merely exemplary embodiments employed to illustrate the principles of the present disclosure, and the present disclosure is not limited thereto. It will be apparent to one of ordinary skill in the art that various changes and modifications may be made therein without departing from the spirit and scope of the present disclosure, and such changes and modifications are to be considered within the scope of the present disclosure.

What is claimed is:

1. A multimedia playback monitoring system, comprising an authentication image generator, a playback controller, an image compressor, and an analyzer, wherein:

the authentication image generator is configured to generate a first transparent image according to a display terminal, and embed first identification information generated in advance into the first transparent image through an information embedding algorithm to obtain an identity authentication image for a playback plan, the first identification information represents identity authentication information, and the identity authentication information represents the playback plan in a playback plan table;

the playback controller is configured to generate data to be displayed according to a received playback plan, a multimedia file corresponding to the playback plan, and the identity authentication image, and the data to be displayed is for being displayed by the display terminal;

the image compressor is configured to take a screenshot of a target image displayed by the display terminal and compress the screenshot to obtain compressed data; and the analyzer is configured to analyze the compressed data according to resolution information of the display terminal to obtain second identification information, compare the second identification information with the first identification information, and determine whether display by the display terminal is accurate or not according to a comparison result.

2. The multimedia playback monitoring system according to claim 1, wherein the authentication image generator comprises a first transparent image generation unit, a first data generation unit, a data embedding unit, and an image generation unit, and the first identification information comprises first encoded data;

the first transparent image generation unit is configured to generate a first transparent image layer according to the resolution information of the display terminal, the first transparent image layer has a peripheral region and a central region surrounded by the peripheral region, display data of the central region is set as first preset data, and display data of the peripheral region is set as second preset data, thereby generating the first transparent image;

the first data generation unit is configured to encode the identity authentication information to obtain the first encoded data;

the data embedding unit is configured to embed the first encoded data into at least one first preset region in the first transparent image, and the at least one first preset region is located in the peripheral region; and the image generation unit is configured to set the first transparent image embedded with the first encoded data as the identity authentication image.

3. The multimedia playback monitoring system according to claim 2, wherein the at least one first preset region comprises two first preset regions oppositely disposed in the peripheral region; and the data embedding unit is configured to embed the first encoded data into each of the two first preset regions.

4. The multimedia playback monitoring system according to claim 3, wherein the data embedding unit comprises a division subunit, a data transformation subunit, and a data embedding subunit; and the image generation unit comprises a data inverse transformation subunit and an image generation subunit;

the division subunit is configured to determine, according to a number of pixels of the first transparent image occupied by each first preset region and a data amount of the first encoded data, a first target pixel number required for hiding a piece of encoded subdata of the first encoded data; target pixels of which a number is equal to the first target pixel number occupy a first hiding sub-region in the first preset region;

the data transformation subunit is configured to perform discrete transformation on three channels of each target pixel in the first hiding sub-region to obtain a first discrete coefficient;

the data embedding subunit is configured to determine a first embedding component for the three channels according to the first discrete coefficient, a preset first embedding key, and the encoded subdata;

the data inverse transformation subunit is configured to perform inverse discrete transformation on the first embedding component for the three channels to obtain first hidden data located in the first hiding sub-region; and the image generation subunit is configured to set the first transparent image containing the first hidden data in each first hiding sub-region of the first preset region as the identity authentication image.

5. The multimedia playback monitoring system according to claim 4, wherein the analyzer comprises an analysis unit, a second data generation unit, and a comparison unit, and the second identification information comprises second encoded data;

the analysis unit is configured to decompress the compressed data to obtain a decompressed image, position a first hiding sub-region in the decompressed image according to the resolution information of the display terminal, generate a second transparent image according to the display terminal, respectively extract a target pixel in the decompressed image and a target pixel in the second transparent image according to each first hiding sub-region, and analyze these target pixels to obtain the second encoded data;

the second data generation unit is configured to encode the identity authentication information to obtain the first encoded data; and the comparison unit is configured to compare the first encoded data with the second encoded data, and determine whether the display by the display terminal is accurate or not according to a comparison result.

6. The multimedia playback monitoring system according to claim 5, wherein the analysis unit comprises a step length determination subunit, a region positioning subunit, a second transparent image generation subunit, and an analysis subunit;

the step length determination subunit is configured to determine, according to the number of pixels of the first transparent image occupied by the first preset region and the data amount of the encoded data, the first target pixel number required for hiding a piece of encoded subdata of the first encoded data;

the region positioning subunit is configured to decompress the compressed data to obtain a decompressed image, position a first hiding sub-region in the decompressed image according to the resolution information of the display terminal and the first target pixel number;

the second transparent image generation subunit is configured to generate a second transparent image layer according to resolution information of the display terminal such that the second transparent image layer has a peripheral region and a central region surrounded by the peripheral region, set display data of the central region as first preset data, and set display data of the peripheral region as second preset data, thereby generating the second transparent image; and the analysis subunit is configured to, for a first hiding sub-region in the first preset region, extract each target pixel of the second transparent image located in the first hiding sub-region, perform discrete transformation on three channels of each target pixel to obtain a third discrete coefficient, extract each target pixel of the decompressed image located in the first hiding sub-region, perform discrete transformation on three channels of each target pixel to obtain a fourth discrete coefficient, and determine a piece of encoded subdata in the second encoded data according to the third discrete coefficient, the fourth discrete coefficient, and a preset first embedding key.

7. The multimedia playback monitoring system according to claim 6, wherein the comparison unit is configured to: determine a first matching accuracy rate and a correlation coefficient between the first encoded data and the second encoded data, where the first matching accuracy rate is a ratio of a number of identical bits between the first encoded data and the second encoded data to the data amount of the first encoded data, and the correlation coefficient represents a relevancy between the first encoded data and the second encoded data; and determine that the display by the display terminal is correct if the first matching accuracy rate is greater than a first preset threshold and the correlation coefficient is greater than a second preset threshold.

8. The multimedia playback monitoring system according to claim 4, wherein the first identification information further comprises first hash data;

the first data generation unit is further configured to hash the first encoded data to obtain the first hash data;

the data embedding unit is further configured to embed the first hash data into at least one second preset region in the first transparent image, where the at least one second preset region is located in the peripheral region, and the at least one first preset region is adjacent to the at least one second preset region; and the image generation unit is configured to set the first transparent image embedded with the first encoded data and the first hash data as the identity authentication image.

9. The multimedia playback monitoring system according to claim 8, wherein the at least one second preset region comprises two second preset regions oppositely disposed in the peripheral region; and the data embedding unit is configured to embed the first hash data into each of the two second preset regions.

10. The multimedia playback monitoring system according to claim 9, wherein the data embedding unit comprises the division subunit, the data transformation subunit, and the data embedding subunit; and the image generation unit comprises the data inverse transformation subunit and the image generation subunit;

the division subunit is configured to determine, according to a number of pixels of the first transparent image occupied by each second preset region and a data amount of the first hash data, a second target pixel number required for hiding a piece of hash subdata of the first hash data; target pixels of which a number is equal to the second target pixel number occupy a second hiding sub-region in the second preset region;

the data transformation subunit is configured to perform discrete transformation on three channels of each target pixel in the second hiding sub-region to obtain a second discrete coefficient;

the data embedding subunit is configured to determine a second embedding component for the three channels according to the second discrete coefficient, a preset second embedding key, and the hash subdata;

the data inverse transformation subunit is configured to perform inverse discrete transformation on the second embedding component for the three channels to obtain second hidden data located in the second hiding sub-region; and the image generation subunit is configured to set the first transparent image containing the first hidden data and the second hidden data that is in each second hiding sub-region of the second preset region as the identity authentication image.

11. The multimedia playback monitoring system according to claim 8, wherein the analyzer comprises an analysis unit, a second data generation unit, and a comparison unit, and the second identification information comprises second encoded data and second hash data;

the analysis unit is configured to decompress the compressed data to obtain a decompressed image, position a first hiding sub-region and a second hiding sub-region in the decompressed image according to the resolution information of the display terminal, generate a second transparent image according to the display terminal, respectively extract a target pixel in the decompressed image and a target pixel in the second transparent image according to each first hiding sub-region, analyze these target pixels to obtain the second encoded data, respectively extract the target pixel in the decompressed image and the target pixel in the second transparent image according to each second hiding sub-region, and analyze these target pixels to obtain the second hash data;

the second data generation unit is configured to encode the identity authentication information to obtain the first encoded data, and hash the encoded data to obtain the first hash data; and the comparison unit is configured to: compare the first hash data with the second hash data, and determine whether the display by the display terminal is accurate or not according to a comparison result; if the display by the display terminal is determined to be incorrect, obtain the first encoded data and the second encoded data, compare the first encoded data with the second encoded data, and determine whether the display by the display terminal is accurate or not according to a comparison result.

12. The multimedia playback monitoring system according to claim 11, wherein the analysis unit comprises a step length determination subunit, a region positioning subunit, a second transparent image generation subunit, and an analysis subunit;

the step length determination subunit is configured to: determine, according to the number of pixels of the first transparent image occupied by the first preset region and the data amount of the encoded data, the first target pixel number required for hiding a piece of encoded subdata of the first encoded data; and determine, according to a number of pixels of the first transparent image occupied by the second preset region and a data amount of the hash data, a second target pixel number required for hiding a piece of hash subdata of the first hash data;

the region positioning subunit is configured to decompress the compressed data to obtain a decompressed image, position a first hiding sub-region in the decompressed image according to the resolution information of the display terminal and the first target pixel number, and position a second hiding sub-region in the decompressed image according to the resolution information of the display terminal and the second target pixel number;

the second transparent image generation subunit is configured to generate a second transparent image layer according to resolution information of the display terminal such that the second transparent image layer has a peripheral region and a central region surrounded by the peripheral region, set display data of the central region as first preset data, and set display data of the peripheral region as second preset data, thereby generating the second transparent image; and the analysis subunit is configured to: for a first hiding sub-region in the first preset region, extract each target pixel of the second transparent image located in the first hiding sub-region, perform discrete transformation on three channels of each target pixel to obtain a third discrete coefficient, extract each target pixel of the decompressed image located in the first hiding sub-region, perform discrete transformation on three channels of each target pixel to obtain a fourth discrete coefficient, determine a piece of encoded subdata in the second encoded data according to the third discrete coefficient, the fourth discrete coefficient, and a preset first embedding key; and for a second hiding sub-region in the second preset region, extract each target pixel of the second transparent image located in the second hiding sub-region, perform discrete transformation on three channels of each target pixel to obtain a fifth discrete coefficient, extract each target pixel of the decompressed image located in the second hiding sub-region, perform discrete transformation on three channels of each target pixel to obtain a sixth discrete coefficient, determine a piece of hash subdata in the second hash data according to the fifth discrete coefficient, the sixth discrete coefficient, and a preset second embedding key.

13. The multimedia playback monitoring system according to claim 11, wherein the comparison unit is configured to: determine a second matching accuracy rate between the first hash data and the second hash data, where the second matching accuracy rate is a ratio of a number of identical bits between the first hash data and the second hash data to a data amount of the first hash data, determine that the display by the display terminal is correct if the second matching accuracy rate is greater than a third preset threshold; and if the display by the display terminal is determined to be incorrect, obtain the first encoded data and the second encoded data, determine a first matching accuracy rate and a correlation coefficient between the first encoded data and the second encoded data, where the first matching accuracy rate is a ratio of a number of identical bits between the first encoded data and the second encoded data to the data amount of the first encoded data, and the correlation coefficient represents a relevancy between the first encoded data and the second encoded data, and determine that the display by the display terminal is correct if the first matching accuracy rate is greater than a first preset threshold and the correlation coefficient is greater than a second preset threshold.

14. A multimedia playback monitoring method, comprising:

generating a first transparent image according to a display terminal, and embedding first identification information generated in advance into the first transparent image through an information embedding algorithm to obtain an identity authentication image for a playback plan, wherein the first identification information represents identity authentication information, and the identity authentication information represents the playback plan in a playback plan table;

generating data to be displayed according to a received playback plan, a multimedia file corresponding to the playback plan, and the identity authentication image, wherein the data to be displayed is for being displayed by the display terminal;

taking a screenshot of a target image displayed by the display terminal and compressing the screenshot to obtain compressed data; and analyzing the compressed data according to resolution information of the display terminal to obtain second identification information, comparing the second identification information with the first identification information, and determining whether display by the display terminal is accurate or not according to a comparison result.

15. A computer apparatus, comprising a processor, a memory, and a bus, wherein the memory stores therein machine-readable instructions executable by the processor, the processor and the memory communicate with each other through the bus when the computer apparatus operates, and the machine-readable instructions, when executed by the processor, causes the processor to perform steps of the multimedia playback monitoring method according to claim 14.

16. A non-transitory computer readable storage medium, having a computer program stored thereon, wherein the computer program, when being executed by a processor, causes the processor to perform steps of the multimedia playback monitoring method according to claim 14.

17. An electronic apparatus, comprising the multimedia playback monitoring system according to claim 1 and a display terminal.

* * * * *